(12) United States Patent
Karl et al.

(10) Patent No.: US 10,975,610 B2
(45) Date of Patent: Apr. 13, 2021

(54) METHOD FOR THE PRODUCTION OF AN INSULATING PROFILE

(71) Applicant: Ensinger GmbH, Nufringen (DE)

(72) Inventors: Christoph Karl, Cham (DE); Willi Weissthanner, Arnschwang (DE); Michael Möller, Cham (DE)

(73) Assignee: Ensinger GmbH, Nufringen (DE)

( * ) Notice: Subject to any disclaimer, the term of this patent is extended or adjusted under 35 U.S.C. 154(b) by 0 days.

(21) Appl. No.: 16/592,221

(22) Filed: Oct. 3, 2019

(65) Prior Publication Data
US 2020/0109592 A1 Apr. 9, 2020

(30) Foreign Application Priority Data

Oct. 8, 2018 (DE) ..................... 10 2018 124 779.6

(51) Int. Cl.
*E06B 3/273* (2006.01)
*B29C 65/08* (2006.01)
(Continued)

(52) U.S. Cl.
CPC .............. *E06B 3/273* (2013.01); *B29C 65/08* (2013.01); *E06B 3/26305* (2013.01)

(58) Field of Classification Search
CPC ..... E06B 3/273; E06B 3/26305; B29C 65/08; B29C 65/081; B29C 66/81425;
(Continued)

(56) References Cited

U.S. PATENT DOCUMENTS 2,686,556 A * 8/1954 Gerber ............. B29C 66/81871
156/380.7
3,420,026 A * 1/1969 Nolan ................. E06B 3/26347
52/204.51
(Continued)

FOREIGN PATENT DOCUMENTS

DE 1106064 B * 5/1961 ........... B29C 65/743
DE 2823430 A1 5/1979
(Continued)

OTHER PUBLICATIONS

German Patent & Trademark Office, German Search Report in German Application No. 10 2017 107 684.0, dated Feb. 27, 2018.
(Continued)

*Primary Examiner* — Jeannette E Chapman
(74) *Attorney, Agent, or Firm* — Leydig Voit & Mayer

(57) ABSTRACT

A method for producing insulating profiles comprises manufacturing a profile body and a first functional element separately, and the profile body and the first functional element are supplied to an ultrasonic welding device, wherein the profile body and the functional element are connected to one another by a material bond by formation of a welded joint. The profile body and the functional element are brought together into a predetermined first cross-sectional geometry during formation of the welded joint and are thereafter guided in this cross-sectional geometry until the plastics material of the welded joint solidifies to such an extent that the profile body and the first functional element are fixed in the predetermined cross-sectional geometry.

13 Claims, 11 Drawing Sheets

(51) Int. Cl.
*E06B 3/26* (2006.01)
*E06B 3/263* (2006.01)

(58) Field of Classification Search
CPC ............ B29C 66/81419; B29C 66/495; B29C 66/81465; B29C 66/66; B29C 66/81415; B29C 66/71; B29C 66/66721; B29C 66/72712; B29C 66/322; B29C 65/8215; B29C 65/7873; B29C 66/7392
USPC ........................................................ 52/404.1
See application file for complete search history.

(56) References Cited

U.S. PATENT DOCUMENTS

| | | | | |
|---|---|---|---|---|
| 3,441,995 | A * | 5/1969 | Nolan | E06B 3/273 |
| | | | | 29/897.312 |
| 3,547,603 | A * | 12/1970 | Bragman | B21D 53/74 |
| | | | | 29/418 |
| 3,899,116 | A * | 8/1975 | Mims | B23K 20/10 |
| | | | | 228/110.1 |
| 4,190,093 | A * | 2/1980 | Kearney | B22C 7/026 |
| | | | | 156/73.5 |
| 4,328,061 | A | 5/1982 | Off et al. | |
| 4,761,871 | A * | 8/1988 | O'Connor | B29C 66/21 |
| | | | | 29/432.1 |
| 7,913,470 | B2 | 3/2011 | Siodla et al. | |
| 8,973,807 | B2 * | 3/2015 | Fujita | B29C 65/081 |
| | | | | 228/110.1 |
| 10,207,443 | B2 | 2/2019 | Krohmer et al. | |
| 10,858,877 | B2 * | 12/2020 | Hatzky | E06B 3/26303 |
| 2010/0024360 | A1 * | 2/2010 | Ehrmann | B29C 66/8161 |
| | | | | 53/285 |
| 2015/0184444 | A1 * | 7/2015 | Wexler | E06B 3/28 |
| | | | | 52/203 |
| 2017/0089120 | A1 | 3/2017 | Möller et al. | |
| 2017/0334147 | A1 * | 11/2017 | Mayer | B29C 66/1122 |
| 2017/0334564 | A1 | 11/2017 | Born et al. | |
| 2017/0341208 | A1 * | 11/2017 | Koch | B25B 23/10 |
| 2018/0043625 | A1 * | 2/2018 | Schwarz | B29C 65/08 |
| 2018/0304543 | A1 * | 10/2018 | Mayer | B29C 66/30221 |
| 2018/0354203 | A1 * | 12/2018 | Lackore, Jr. | B29C 66/114 |
| 2020/0232498 | A1 * | 7/2020 | Ikada | B29C 66/71 |

FOREIGN PATENT DOCUMENTS

| | | | | |
|---|---|---|---|---|
| DE | 3042838 A1 | 6/1982 | | |
| DE | 3320931 A1 * | 12/1984 | ............ | E06B 3/273 |
| DE | 3939968 A1 * | 6/1991 | ............ | F16B 11/002 |
| DE | 19528498 C1 | 6/1996 | | |
| DE | 19511081 A1 | 9/1996 | | |
| DE | 29621419 U1 | 2/1997 | | |
| DE | 102010064034 A1 | 6/2012 | | |
| DE | 202012010135 U1 | 11/2012 | | |
| DE | 102012009838 A1 | 11/2013 | | |
| DE | 202010018272 U1 | 3/2015 | | |
| DE | 102014103729 A1 | 9/2015 | | |
| DE | 102016208650 A1 | 11/2017 | | |
| DE | 102017107684 A1 | 10/2018 | | |
| EP | 1241100 A1 * | 9/2002 | ......... | B29C 66/8491 |
| EP | 1347141 A1 | 9/2003 | | |
| EP | 2256280 A2 | 12/2010 | | |
| EP | 2432960 A1 | 3/2012 | | |
| EP | 2527580 A1 | 11/2012 | | |
| EP | 3447228 A1 * | 2/2019 | ......... | E06B 3/26301 |
| FR | 2891570 A1 * | 4/2007 | ......... | E06B 3/26305 |
| JP | 09059866 A * | 3/1997 | ......... | B29C 65/7441 |
| NL | 6708614 A * | 1/1968 | ......... | B29C 66/4312 |
| WO | WO 2014/063812 A1 | 5/2014 | | |
| WO | WO 2015/189348 A1 | 12/2015 | | |

OTHER PUBLICATIONS

German Patent and Trademark Office, German Search Report in counterpart German Application No. 10 2018 124 779.6, dated Mar. 6, 2019.

International Search Authority, International Search Report in International Patent Application No. PCT/EP2018/056742, dated May 14, 2018.

* cited by examiner

FIG.7B
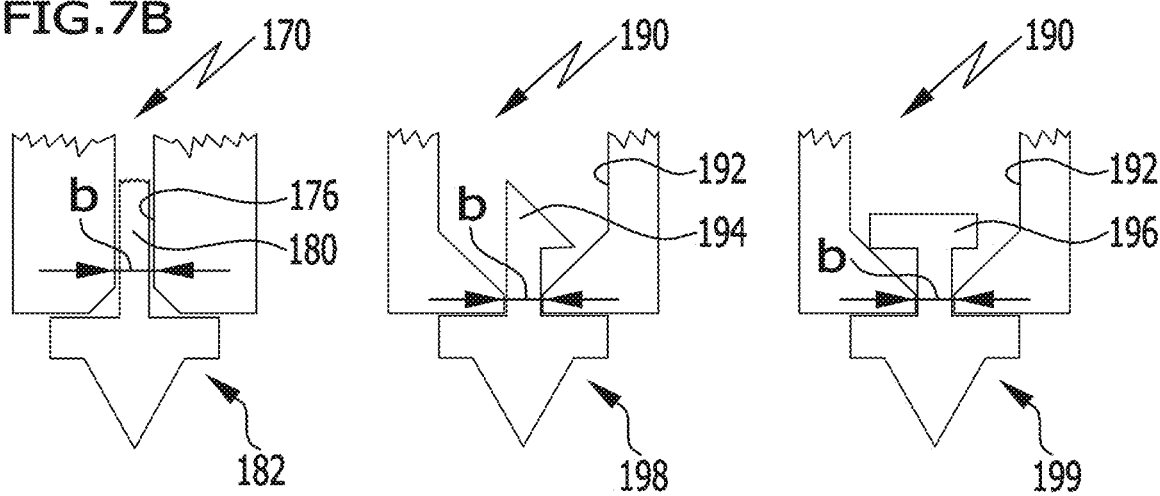
FIG.8
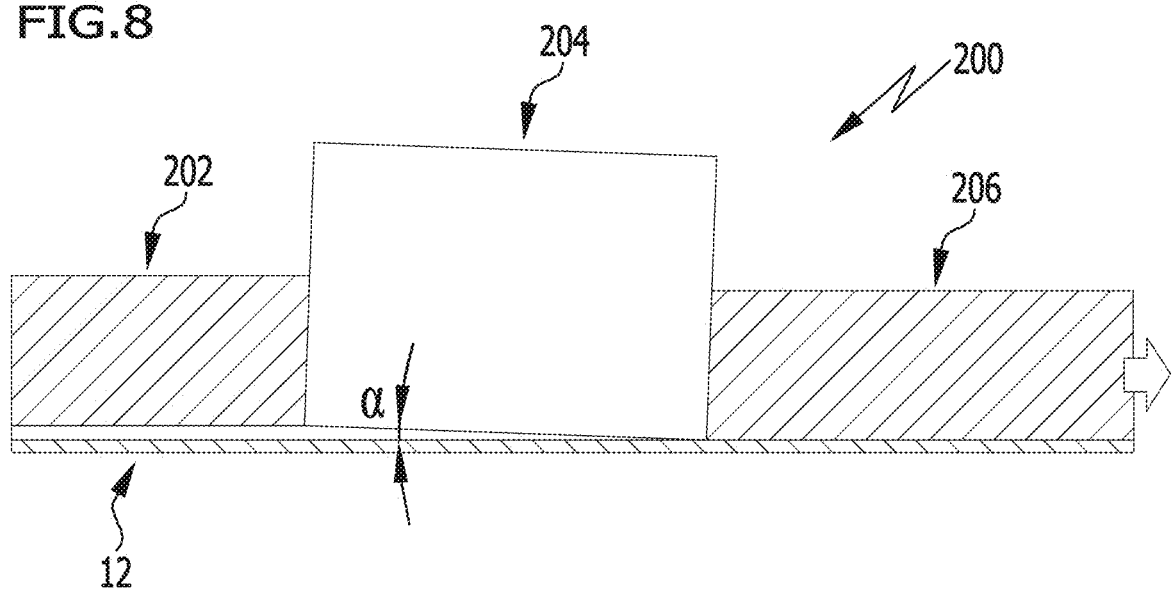
(a)
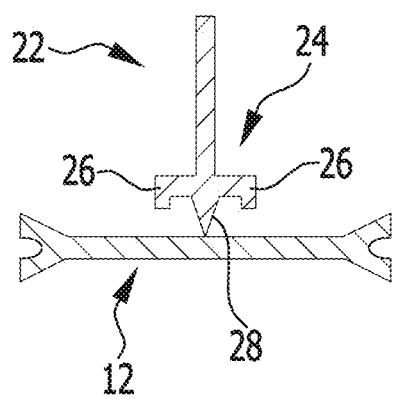
(b)
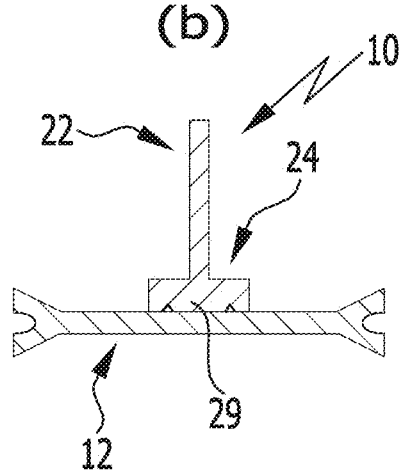

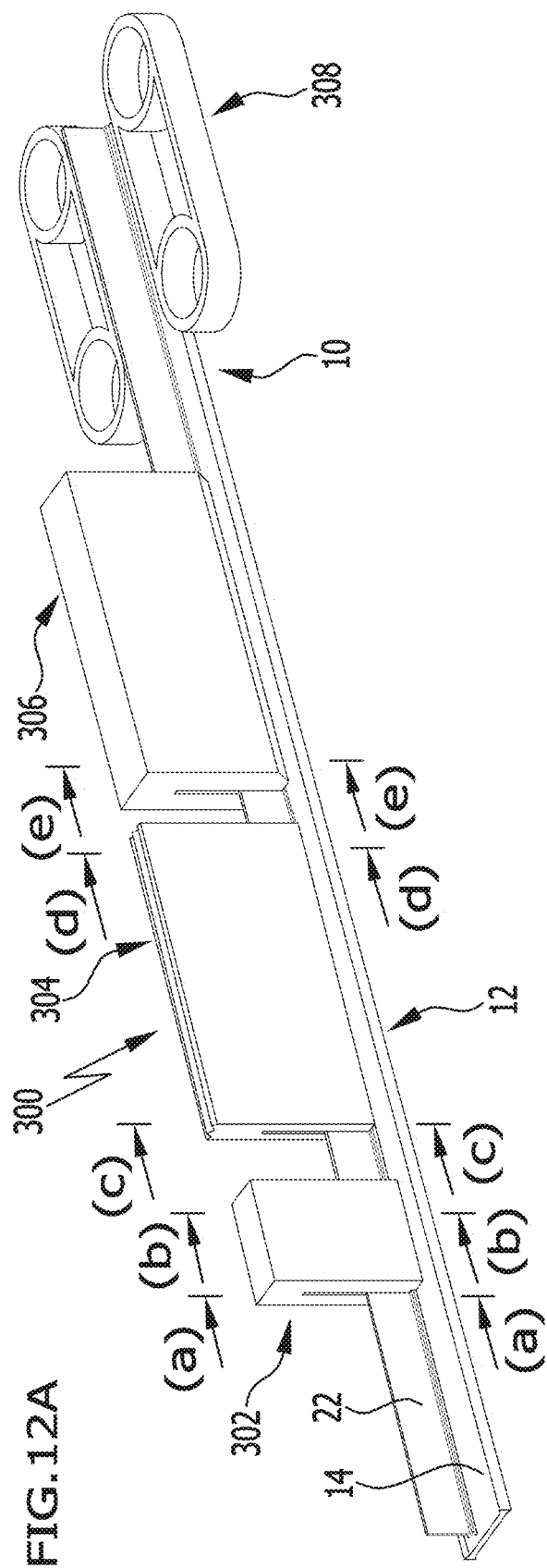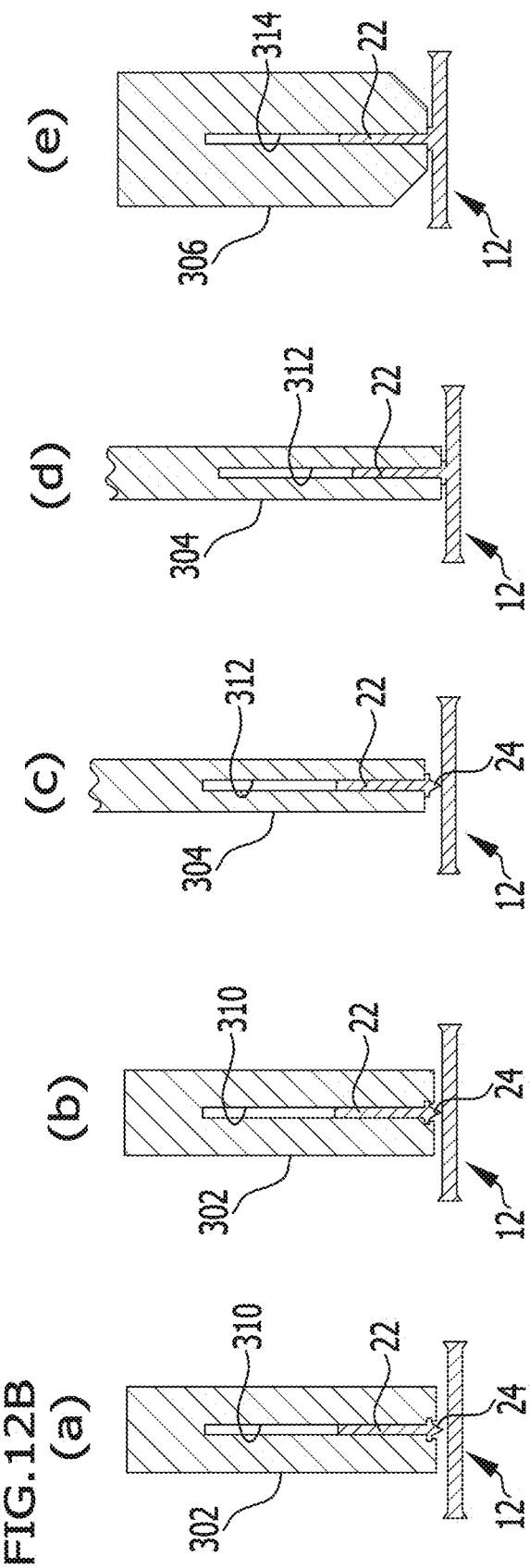

FIG.16B
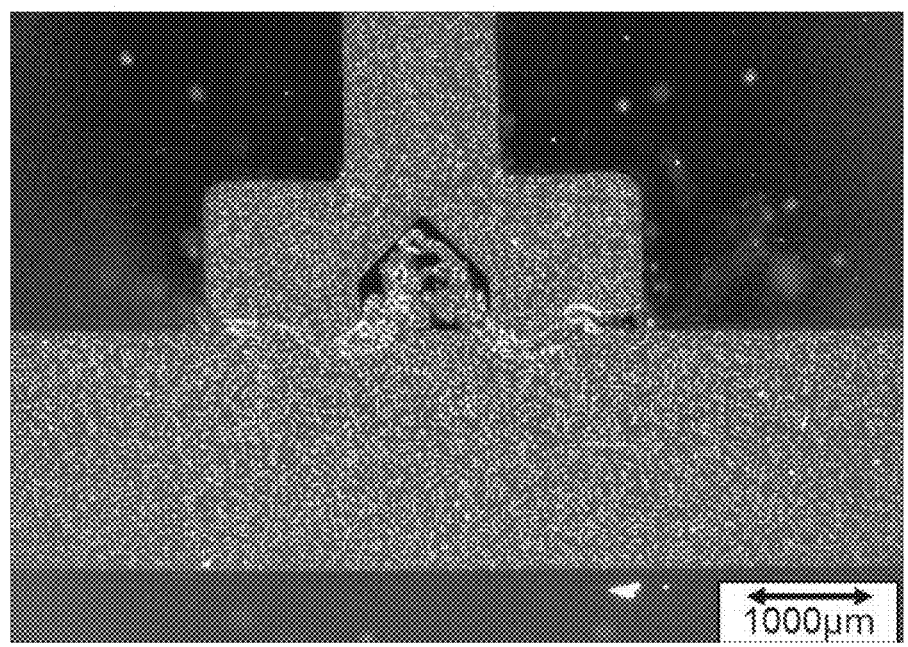
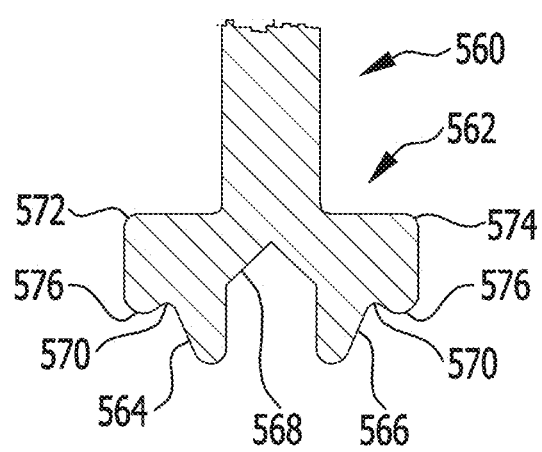

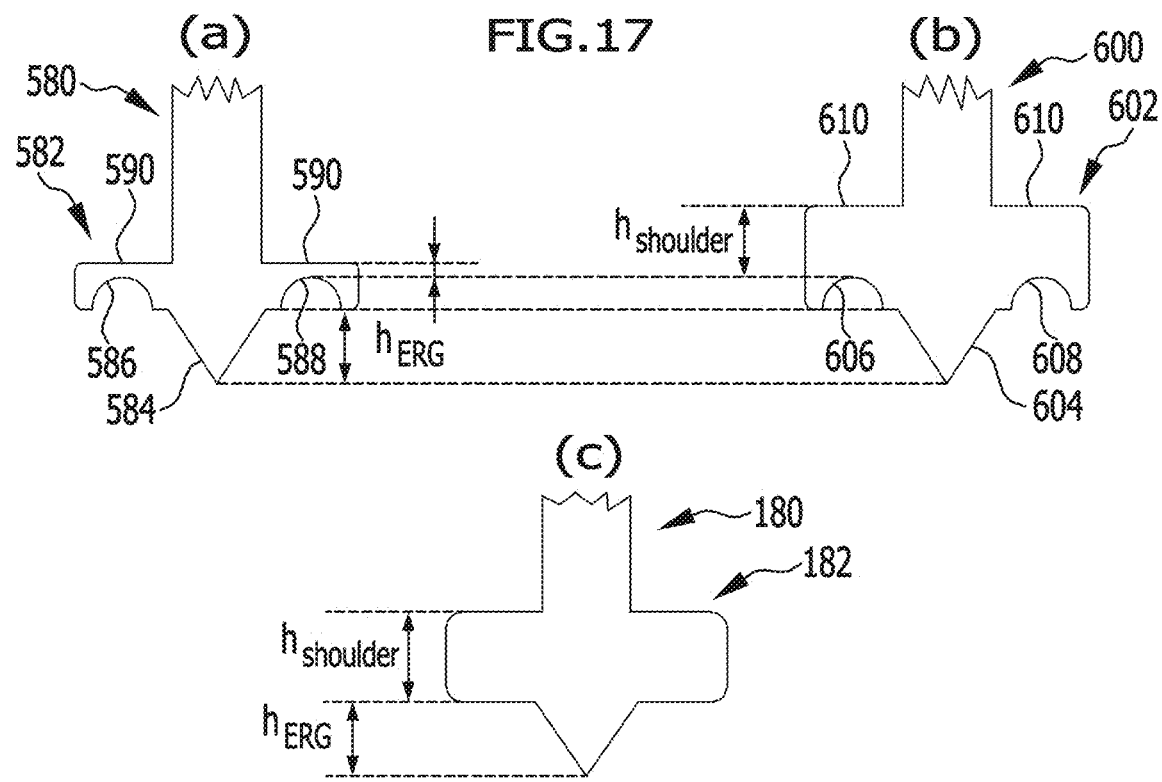
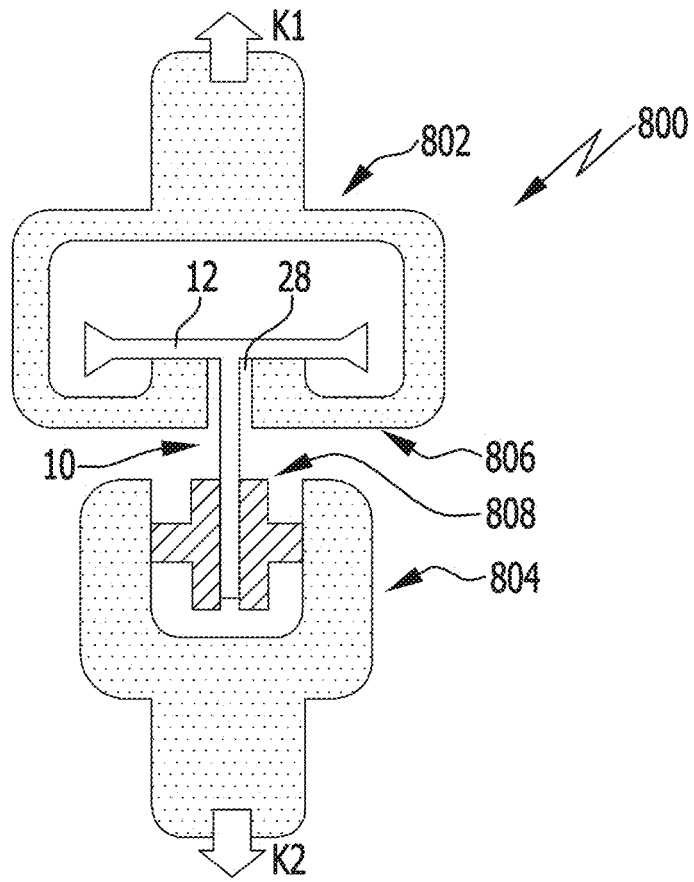

METHOD FOR THE PRODUCTION OF AN INSULATING PROFILE

CROSS-REFERENCE TO RELATED APPLICATIONS

This patent application claims the benefit under 35 USC 119(b) of German application No. 10 2018 124 779.6, filed Oct. 8, 2018, which is incorporated by reference.

BACKGROUND OF THE INVENTION

The invention relates to a method for the production of an insulating profile, in particular, for the production of window, door and facade components and also to the insulating profiles produced by the method. The insulating profile that is to be manufactured comprises an insulating bar manufactured from a first polymer material which comprises a profile body as well as a first functional element which both extend in the longitudinal direction of the insulating profile, wherein the first functional element is connected to the insulating bar in a contact region by a material bond.

In particular, the insulating profiles mentioned hereinabove are employed in diverse manners for the production of metal-plastics composite profiles wherein the insulating profiles serve for heat insulating and/or sound-proofing of the composite profiles and typically connect two metal profiles to one another.

Furthermore, the insulating profiles produced in accordance with the invention find use as so-called chicanes which function as sills, e.g., in the sliding systems of large sized windows or doors. Finally, the insulating profiles in accordance with the invention are suitable as facade spacers which are used in particular in order to hold neighboring glass window panes or other facade panels spaced from each other in the case of facades and glass roof structures and, if necessary, to fill any gaps occurring between them.

Until now, the insulating profiles mentioned hereinabove have usually been manufactured in accordance with the special geometrical requirements of the customers. To this end, high-priced extruding tools are made utilising complex methods with which the sought-for contours of the insulating profile demanded by the customer can then be produced exactly.

Apart from the high tooling costs, a further disadvantage of this classical method is the missing flexibility on the part of the manufacturer to be able to react to particular requests for alterations in regard to adaptations of the geometry of the composite. Thus for example, one cannot simply increase the visible width of the metal-plastics composite while maintaining the insulating profile without losing out on the insulating effect.

BRIEF SUMMARY OF THE INVENTION

This problem is met in the state of the art by various sets of solutions.

Fundamentally, it is to be noted that insulating profiles of this type represent safety-relevant components which are checked for suitability, e.g., in Germany, according to DIN EN 14024.

Insulating profiles to which foam bodies are later added are known. Hereby, the latter are fixed to the insulating profile by either a material bond or in positively-fitting manner. For example, EP 1 347 141 A1 describes an insulating profile which is combined with foam strips of differing height.

DE 10 2010 064 034 A1 likewise describes metal-plastics composite profiles the properties of which are optimized using subsequently applied foam material.

Further solutions are marketed which differ from one another due to the numerous varieties of possible insulating foams. Up to a point, heavy demands are made on these foams, in particular, if the foams in the composite profile go through a process step involving "coating with a powder lacquer". There are only a few foam technologies which will withstand the diverse chemical pre-treatment baths and a following temperature loading of over 200° C. when subjected to firing during the coating process. Hereby, these foams should exhibit a very low heat conductivity, be low-priced as well as being environmentally friendly or recyclable. Until today, there has been no system which fulfils all of these requirements.

Another approach is the application of functional elements in the form of flags or the subsequent formation of hollow chamber structures, e.g., by polymer or metallic materials.

From DE 296 21 419 U1, it is known that one can produce insulating profiles in a variable manner by clipping a U-shaped profile onto a basic profile. These insulating profiles can be simply adapted in order to optimize the composite profile in regard to the insulating effect thereof. A disadvantage of this method however is the necessity for so-called fixing noses on the basic profile for producing the clip connection, whereby these noses additionally define the fixing position of the hollow chamber that is to be formed in an unchangeable manner.

DE 195 28 498 C1 and DE 10 2012 009 838 A1 based on this specification describe one possibility for producing composite profiles wherein flags are subsequently attached to an insulating profile/basic profile.

For this purpose, DE 195 28 498 C1 describes molded-on or co-extruded flags consisting of, e.g., polyamide or polyester materials, as well as metallic flags. However, one cannot derive from these specifications how a metallic flag can be firmly attached for a long period without significantly worsening the thermal insulating effect and the mechanical properties—especially the transverse tensile strength, e.g., according to DIN EN 14024.

DE 10 2012 009 838 A1 describes an insulating profile with a flag structure which comprises a plurality of insulating hollow chambers running in parallel, wherein the flag can be produced from an, e.g., plastics foil material.

Due to the thin wall thicknesses of foil materials in combination with the hollow chamber structure described, products of this type are obviously disadvantageous compared with other solutions in the event of fire. The attachment of the flag is effected by, e.g., adhesion or welding. Moreover, free-standing thin plastic films have the disadvantage that they are easily bendable. During transportation and when storing products of this type in a transport container, it is therefore probable that flags consisting of freestanding foils will spread out under the dead weight of the profiles, become bent and deform permanently. This scenario represents a typical criterion for rejection.

A composite profile with insulating profiles consisting of plastics and having bridging, heat insulating metallic transverse flags is described in DE 195 11 081 A1.

In EP 2 527 580 A1, there is described a composite profile in which the function of a transverse flag is realized by a separate profile which is fixed to one of the metal shells of the composite profile.

The lengthening of flags in the case of insulating profiles by means of adapters is to be found described in, e.g., EP 2

432 960 A1. However, one can perceive merely from the cross-sectional areas of the described and shown profile geometries alone, that this solution is only realizable by employing a large amount of material.

A wide variety of insulating profiles having the function of spacers for facade components are known, for example, from WO 2015/189348 A1.

Amongst other things, methods for welding endless or sheet materials by means of ultrasonics are widespread in the consumer goods industry and are employed in, e.g., the production of diapers, plastic bags or blister packs. Hereby, plastic films of very low thickness are usually used as so-called joining partners which are then welded in-line with the aid of roller sonotrodes or (accompanying) clocked sonotrode stampers. These welding processes are not however suitable for producing plastics parts having thicknesses in the millimeter range, e.g., insulating bars, with high output speeds and high dimensional accuracy. Problematic above all in the case of the known ultrasonic welding processes is the relatively small energy input of roller sonotrodes due to the very small effective contact area of a sonotrode (this results from the radius of a sonotrode roller) or the large amount of deformation of the products at the offset locations when using clocked stamping sonotrodes.

The object of the invention is to propose a method with which the insulating profiles can be produced economically and be easily adaptable to a customers specific requirements in regard to the functionality of the insulating profile.

In accordance with the invention, this object is achieved by means of a method in accordance with claim 1.

In the method for the production of an insulating profile in accordance with the invention, in a first step, both the profile body and the first functional element are each manufactured and provided separately, wherein, in a second step downstream thereof, the profile body and the first functional element are supplied in the longitudinal direction of the insulating bar that is to be formed to an ultrasonic welding device in which the profile body and the functional element are connected to one another by means of a material bond by the formation of a welded joining, wherein the ultrasonic welding device comprises a welding zone that is equipped with a sonotrode or else a plurality of sonotrodes. The sonotrode(s) has/have a recess in which the functional element is guided during the formation of the welded joining.

During the formation of the welded joining, the profile body and the functional element are brought together into a predetermined first cross-sectional geometry as seen perpendicularly to the longitudinal direction and thereafter are guided with the predetermined first cross-sectional geometry or, if applicable, with a predetermined second cross-sectional geometry that differs from the first cross-sectional geometry as seen perpendicularly to the longitudinal direction until the plastics material of the welded joining has solidified to such an extent that the profile body and the first functional element are fixed in the predetermined cross-sectional geometry.

The latter is typically the case when the polymer materials in the region of the welded joining have cooled down to a temperature which lies below their crystallite fusing temperature or their softening temperature.

DETAILED DESCRIPTION OF THE INVENTION

The ultrasonic frequency used in the case of the ultrasonic welding process in accordance with the invention lies within the range of 20 kHz to 40 kHz for example.

The profile body or the insulating bar on the one hand and the first functional element on the other are also referred to hereinafter as joining partners.

In the method in accordance with the invention, the profile body and the first functional element can be supplied continuously or intermittently to the ultrasonic welding device.

Hereby, the profile body and/or the first functional element can be provided in the form of a continuous material or in lengths.

A large degree of flexibility in the manufacturing process is already ensured by each of the two aforementioned aspects.

Firstly in accordance with the invention, an insulating bar with a profile body (or else, if necessary, a plurality of profile bodies) and optionally a formed rim section of the profile body is produced, wherein one or more first functional elements, e.g., in the form of so-called flags and/or other functional parts are later connected to the insulating bar by a material bond. Likewise, the functional elements are also frequently produced from a polymer material.

Frequently, the insulating bar is constructed with two rim sections which are formed oppositely on the profile body perpendicularly to the longitudinal direction of the insulating profile.

The connection of the profile body to the first functional element or to the first functional elements by a material bond can be effected sequentially in the longitudinal direction of the insulating profile, i.e., in particular continuously, or else in point-like manner at a plurality of sequential, mutually spaced positions or in sections.

Moreover, the insulating bar may also comprise two or more profile bodies, wherein, in total, at least one rim section is typically formed on one of the profile bodies.

The wall thickness of the profile bodies of the insulating profiles produced in accordance with the invention frequently amounts to approx. 0.6 mm up to approx. 2.5 mm, preferably to approx. 0.7 mm up to approx. 2 mm. However, in special cases of employment, they could also be thicker.

The first functional elements preferably extend markedly away from the surface of the profile body or the rim section (in the perpendicular direction), for example, approx. 3 mm or more.

The first functional elements frequently have wall thicknesses within the range of approx. 0.6 mm to approx. 2 mm or even more in dependence upon the function assigned to the first functional element.

The functions of the first functional elements are, in particular, the transmission of forces, the accommodation of sealing elements such as elastomeric sealing elements for example, the function of a so-called flag, i.e., a structural component for the partitioning of cavities for the reduction or suppression of convection currents and other things. The shape of the functional elements can then adopt or take the form inter alia of flags, hooks, noses, grooves, T-shaped protrusions or arrows.

Preferably, the functional elements are then manufactured from a material, in particular a polymer material, with an elastic modulus of, e.g., approx. 2000 MPa or more, preferably approx. 3000 MPa or more, and/or a tensile strength of approx. 40 MPa or more.

The connection of the first functional elements to the insulating bar can be effected directly, if necessary, to a projection formed on the insulating bar.

Due to the method in accordance with the invention, the insulating profiles can then be economically manufactured on the one hand in respect of the batch sizes (small batch sizes are also now presentable at relatively low cost to the customer) and also in respect of the raw materials employed, but on the other hand the variety of raw materials in the product does not need be increased unnecessarily. From this ensue advantages for the customer in regard to economy and technical performance, and the insulating profiles are easy to process and reliable in application. In particular hereby, the processing of the profiles comprises

- transporting and storage (e.g., loosely or bundled in a transport container for bar-type goods);
- cutting, sawing and milling, e.g., in order to cut profiles to length, to sharpen, perforate or suitably assemble them for an application;
- conditioning in order to control the moisture content or set-up specific storage and aging conditions;
- carrying out cleaning and pre-treatment steps, e.g., with aqueous dispersions, solutions or solvents, or chemicals in particular in preparation for coating processes (painting, adhesion, etc.);
- carrying out coating processes in particular producing lacquer finishes, e.g., powder coating, baked enamel finishes at temperatures of up to 200° C. or up to 220° C.; as well as
- the application or attachment of foams or foamed materials.

In particular hereby, insulating profiles with highly accurate dimensions, i.e., small tolerances, and in particular high parallelism of the individual components of the insulating profile can be produced. This facilitates to a considerable extent the processing of the insulating profiles into composite profiles.

The polymer material of the insulating bar is preferably a thermoplastic or a weldable, modified duroplastic material (e.g., by use of polymer blends with separate thermoplastic domains). Apart from one or more polymers, the polymer material can contain additional reinforcement materials, in particular fibers and particularly preferred, in the form of glass fibers, and other fillers, additives, coloring materials etc.

The fiber-reinforced polymer materials preferably contain reinforcement fibers with a fraction of from approx. 5 to approx. 60 percentage-weight, further preferred with a fraction of approx. 20 to approx. 50 percentage-weight. This applies in particular for the polymer material of the profile body of the insulating profile in accordance with the invention.

In the method in accordance with the invention, it is preferred that, prior to going through the welding zone, the profile bodies and the functional element be guided in a guidance zone by means of a first guidance device and be positioned in a predetermined, possibly variable position relative to each other and be fed in the longitudinal direction.

It is further preferred in accordance with the invention that, after going through the welding zone, the profile body and the functional element be positioned with a predetermined, possibly variable position relative to each other by means of a second guidance device within the region of a holding zone and fed in the longitudinal direction.

Alternatively, the profile body and the functional element can be pressed against each other with the predetermined force when going through the welding zone and optionally also when going through the second guidance device following the welding zone.

Preferably, the first functional element is manufactured with one or more fusible elements which extends/extend in the form of a projection away from a surface of the contact region of the first functional element, wherein the projection or the projections preferably extends/extend approx. 3 mm or less, more preferably approx. 1.5 mm or less away from the surface. It is advantageous, if the projection or the projections extends/extend away from the surface by approx. 0.2 mm or more, preferably approx. 0.4 mm or more.

In accordance with a variant of the method in accordance with the invention, the profile body and the first functional element are fed towards each other at an acute angle with respect to the longitudinal direction, wherein the guidance extends at an acute angle at least over sub-regions of the welding zone and possibly of the first guidance device and/or the second guidance device. The angle is affected substantially by the height of the energy director hERG as well as by the length of the welding zone and typically amounts to approx. 5° or less, preferably approx. 3° or less, in particular, averaged over the entire length of the welding zone.

In the case of the method in accordance with the invention, it is preferred that the ultrasonic welding process be carried out as a near field welding process, wherein the sonotrode has a direct contact with the first functional element and wherein the sonotrode is preferably arranged at a maximum spacing of approx. 6 mm or less from the profile body.

It is preferred that the welding zone have a length of approx. 5 cm to approx. 50 cm and comprise more than one sonotrode if necessary.

In accordance with the method in accordance with the invention, in the welding zone, the sonotrode(s) adopts/adopt different angular positions relative to the profile body taken with reference to the longitudinal direction, wherein the angular positions vary continuously and/or in step-like manner and the spacing of the sonotrode(s) decreases in the running direction. The angular position of a sonotrode can thereby be fixed in an adjustable manner. In like manner however, it is possible to convert to an automated, dynamic adjustment of the angular position wherein the angular position is varied, e.g., in dependence on the speed of advancement of the joining partners.

Preferably, the welding zone comprises at least one static sonotrode, wherein the static sonotrode is in particular in the form of a grinding sonotrode.

Furthermore, the first functional element is preferably formed in the contact region with one or two shoulder(s) which is/are in contact with the one sonotrode or the sonotrodes in the region of the welding zone. The shoulder(s) is/are subjected to a force in order to bring the first functional element and the insulating bar into the desired cross-sectional geometry or to hold them in the desired cross-sectional geometry.

Typically, the insulating profile is advanced in the longitudinal direction in the welding zone at a speed of approx. 5 m/min or more, preferably of approx. 10 m/min or more. Preferably, the speeds are in the range of approx. 10 to approx. 60 m/min, in particular of approx. 15 to approx. 40 m/min.

It is preferred that the period for which the profile body and the first functional element dwell in the welding zone amounts to approx. 100 to approx. 1000 msec., more preferably approx. 200 to approx. 800 msec.

In accordance with the method in accordance with the invention, the sonotrode can be operated continuously.

It is preferred that the sonotrode be formed with a slot-like or slit-like recess at least in the region in which the sonotrode abuts on the contact region of the first functional element, in particular, the shoulders that are possibly formed in the contact region. It is particularly preferred that the sonotrode abut upon two oppositely located shoulders formed on the functional element. It is further possible for only a part of a sonotrode to abut on a contact region or a part of a contact region of the functional element.

A sonotrode may also comprise an inwardly located larger amount of free space or bulges in order to thereby offer sufficient space for even geometrically demanding functional zones, e.g., hooks, arrows or T-shaped projections.

The width b of a slot or a slit frequently amounts to approx. 1 to approx. 3 mm insofar as simply held orthogonally protruding functional zones such as flags or noses for example are being welded. The recess, even in the form of a slot or slit, typically has a height h of some centimeters, e.g., approx. 1 cm or more, preferably approx. 1 cm to approx. 20 cm. The aspect ratio h/b preferably amounts to 5 or more. As has already been addressed hereinabove, in the event that the recess of the sonotrode differs from the slot or slit shape, the width b for the calculation of the aspect ratio is measured at the position of the sonotrode which neighbors upon the contact region of the first functional element.

In particular, the functional element is formed on the contact region that is to be connected to the profile body with one or more projections which are in the form of energy directors, wherein, in particular, the projections are designed as fusible elements.

It is further preferred that the functional element neighboring the one projection or the projections be provided with one or more stop elements which define the cross-sectional geometry that is being sought when the functional element and the profile body are brought together, wherein the projection or the projections is/are also preferably formed with the function as shoulders.

In accordance with the invention, the connection between the first functional element or the first functional elements and the profile body by means of the material bond can be effected along the longitudinal direction of the insulating profile continuously, in sections or in point-like manner.

In a particularly preferred method in accordance with the invention, apart from the profile body, the functional elements are also provided in the form of a continuous material and, following the production of the connection thereof by a material bond, the insulating profile is cut up into a predetermined length, preferably by a cutting or punching or milling process.

The continuous materials are preferably provided on rollers, spools or reels.

Alternatively, the profile body and/or the functional elements could be provided in the form of bar-type products before the production of the connection by a material bond.

Furthermore, the invention relates to an insulating profile according to claim 14 that is producible in accordance with a method in accordance with claim 1, wherein the profile body comprises a region extending in the longitudinal direction of the insulating profile which is substantially planar.

The insulating profile in accordance with the invention may comprise a profile body which is provided with through-openings having predetermined and in particular regular spacings.

Frequently in the case of the insulating profile in accordance with the invention, the insulating bar comprises at least one rim section which incorporates a connecting element, wherein the connecting element takes the form in particular of a roll-in head for connection with metal profiles.

The mechanical strength of the connection of the first functional elements to the profile body and/or to the at least one rim section should permit simple and secure handling of the insulating profiles during transportation and processing. Likewise, the connection should be sufficiently permanent as to allow it to function in the field of application of the product over a full life cycle; this is familiar to a person skilled in the art.

The strength can be measured, e.g., by a tensile test in which a basic profile of a certain length of the insulating profile is fixed (the reference length for the strength results in [mm]) and a normal force or in certain instances a tangential force is applied to the functional element which is increased until there is partial failure (breaking stress in [N]).

In the case of preferred insulating profiles in accordance with the invention, the welded joining between the profile body and the first functional element by means of a material bond has a strength of approx. 2 N/mm or more, preferably of approx. 5 N/mm or more, and particularly preferred of approx. 10 N/mm or more.

The insulating profile in accordance with the invention may comprise an insulating bar which comprises second and possibly further functional elements formed integrally with the profile body.

In particular, in the case of an insulating profile in accordance with the invention, the first functional element or the first functional elements can be selected from panel elements that are formed with planar, curved, in particular part-circular, branched or bent cross sections and/or elements incorporating a cavity or a plurality of cavities, wherein, in the cross section taken relative to the longitudinal direction, the functional element or the functional elements preferably has/have a T-shaped, arrow-like or hook-like section.

Furthermore, in the case of the insulating profile in accordance with the invention, the first functional element or the first functional elements can form a plurality of, possibly closed, cavities in the longitudinal direction of the insulating profile wherein the cavities are formed, in particular, successively in a line.

Typically, in the case of the insulating profile in accordance with the invention, the profile bodies and possibly the first functional element or the first functional elements are produced from a polymer material which is preferably based on a thermoplastic polymer which is selected from polyamides, polyesters, polyolefins, polyketones, vinyl polymers, polyethers, polycarbonates, polyphenylene sulfides, and their copolymers or blends of these materials.

It is preferred that the polymer material of the first functional element or the first functional elements be selected in such a way that it is compatible with the polymer material of the profile body.

Alternatively the surface and/or a core of the first functional element or the first functional elements can be partly metal-coated or metalized or metallically treated.

It is thereby possible to anchor, e.g., IR-reflective flags made of metal (e.g., from thin aluminum plate) to an insulating bar without this leading to impairment of the insulating properties of the profile body.

For certain applications, it has proved advantageous for the polymer material of the profile body and/or the first functional element to be fiber-reinforced, in particular glass-fiber reinforced.

The rim section or the rim sections can be arranged to be formed with different configurations in relation to the profile body. For example, they can extend substantially parallel to a plane of the profile body or they could also be formed at right-angles with respect to a plane of the profile body.

In accord with a first variant, preferred insulating profiles in accordance with the invention comprise a profile body having a region extending in the longitudinal direction of the insulating profile which is formed substantially planar. If necessary, the profile body or else the profile bodies could be formed such as to be planar overall.

In some preferred embodiments of the invention, the insulating profiles comprise at least one of the rim sections equipped with a connecting element which can, in particular, be formed such as to be in the form of a roll-in head.

In principle, a plurality of insulating bars of very different profile geometry can be used in order to produce insulating profiles in accordance with the invention. This also includes in particular hollow-chamber profiles. Typical shapes, sizes and material variants of insulating profiles are to be found, e.g., in the standard catalogues of Insulbar® products from the Ensinger company or other profile makers.

Direct temperature control of the welding process or the plasticized polymer material in the region of the welding seam is not necessary. Rather, precise and complete control of the joining process is made possible by the processes of monitoring and regulating the input of energy into the ultrasonic welding system or into the sonotrode(s). Typically hereby, the (electrical) energy required permits a direct conclusion to be drawn in regard to the quality of the weld and thus of the product quality of the insulating profile in accordance with the invention.

The relevant fusion point can, if not known, be determined by calorimetric measurements. A softening temperature can usually be derived from technical data sheets and tables of materials or it can be determined, e.g., in a Vicat process, in particular, according to DIN EN ISO 306 for the determination of the Vicat softening temperature.

Preferred insulating profiles in accordance with the invention are those in which the first functional element or the first functional elements are produced from a polymer material, preferably on the basis of a thermoplastic polymer. Frequently, a thermoplastic polymer will form the main constituent of the polymer material, but a thermoplastic polymer can also be contained in the polymer material merely as a minority component.

Further constituents of the polymer material can be selected in particular from reinforcement materials (e.g., glass, carbon, mineral or polymer fibers), fillers (glass in the form of glass powder, balls or hollow balls, chalk, talc, wood dust, silicates, in particular layer silicates or amorphous silicic acids), additives (e.g., stabilizers, sliding means and lubricants, softeners, impact resistance modifiers, warmth and heat stabilizers, flame protection means, couplers, cross-linking agents), coloring materials (e.g., colorants or pigments), other polymers (e.g., in polymer blends or copolymers) etc.

In connection therewith, the polymer material of the functional elements and/or the insulating bars can be implemented such as to be fully porous or else merely porous in partial regions. A closed cellular porosity is preferred.

If a mechanical loading of the functional elements is foreseeable when processing the insulating profiles or in the employment of the product, one can dimension the functional elements to produce both bulkier and firmer/more rigid materials, preferred then are materials with an elastic modulus of approx. 2000 MPa or more, particularly preferred are materials having an elastic modulus of approx. 3000 MPa or more.

In the case of alternative insulating profiles in accordance with the invention, the first functional element or the first functional elements is/are manufactured on the basis of a metallic material, wherein the metallic material is employed in particular in the form of foils or sheet metals, possibly in combination with functional parts manufactured from plastics material. Thereby, in the case of these embodiments too, the contact region is made from a second polymer material which is compatible with the first polymer material.

The process of welding two joining partners in accordance with the method in accordance with the invention is effected by a process of plasticizing the polymer material in the contact region of the joining partners. The type, composition and the state (e.g., humidity content) of the material as well as the quantity of energy utilized, the duration (preheating, heating, pressing and holding time), the pressure applied or contact pressure on the joining partners have an influence on the formation of the weld. Due to the introduction of energy in the form of ultrasonic vibrations and the simultaneous application of a contact pressure, the polymer material of both joining partners is melted commencing from the tapering of the energy director. In particular thereby, the tapering of the energy director also melts, the resultant smelt in the joining region yields to the contact pressure and is optionally driven out in free side directions. Temporarily thereby, a plasticized zone is formed in the joining region which, following the cooling/solidifying of the polymer material, as a rule no longer permits of a clear association with one of the joining partners.

The input of energy, the quality and in particular the strength of the welding seam are controllable by an appropriate design of the energy directors. Likewise, it can also be controlled therewith as to whether and how much smelt will be driven out from the joining zone and to where the smelt will flow. This can be used in a targeted manner in order to obtain a visually attractive product, in particular, if internally located, not directly observable smelt reservoirs are provided in the layout.

It is preferred that the energy director be provided with a point having an angle of 30° to 120° and an available height of the point (hERG) of approx. 200 µm to approx. 3 mm, preferably up to approx. 1.5 mm. However, it is also possible for the energy directors to be blunt or rounded and/or be provided with radii or steps. The use of such steps makes it possible for the height of the "smelting" in the welding process to be predetermined since, e.g., one of the steps can then function as a limiting stop.

The introduction of the ultrasonic energy can also be effected if an energy director is not present in the contact region of the first functional element. The location for the introduction of energy is carefully selected by a person skilled in the art, in accordance with the possibilities, the introduction of energy is effected in the proximity of the contact zone of the joining partners or the joining zone, preferably, the spacing of the sonotrode from the joining zone (or from the profile body) is approx. 15 mm or less, particularly preferred is a distance of approx. 6 mm or less.

Thus in particular, the method in accordance with the invention also enables the placement and welding of functional elements on insulating bars which are themselves implemented as hollow-chamber profiles. Consequently, functional zones can also be placed directly on the generally rather thin walls of hollow-chamber profiles.

In a first embodiment, the introduction of the energy is preferably effected by a static sonotrode which is implemented, e.g., in the form of a grinding sonotrode with substantially rectangular contact areas, or in the form of a contact skid or a block sonotrode, a slotted block sonotrode, a cutting sonotrode, a double cutting-edge sonotrode, the joining partners or the joining partners is/are then usually fed past it in permanent contact with the sonotrode.

A person skilled in the art can adopt the commonly available measures for minimizing the wear on the sonotrode due to the permanent and intensive frictional and sliding contact with the polymer materials being used and, if necessary, to also reduce the friction itself.

The contact pressure is effective from the sonotrode via the joining partners to an opposing stop or an anvil. This anvil can be designed in the form of rollers, contact skids, or as a rigid block or the like for example.

The positioning of the two joining partners can be effected by geometrical delimitations, e.g., guidance and stop elements in the form of rollers, rails, conveyer belts or matrices.

The compression process can be divided into a pressing and a holding process, wherein a static or variable pressing force (FA) or holding force (FH) is exerted in each case. Thereby, control of the compressing process can be effected in force-controlled manner (a force F is predetermined as a target, the path or the compression depth then results therefrom automatically) or path-controlled manner (a path, or a compression depth is predetermined, the system applies the force necessary for this purpose).

The requisite activating times of the forces FA and FH are dependent on the various basic conditions (material selection, geometry, welding temperatures, the type of force introduction process etc.). However, what is important here is that the holding force FH should be effective for a sufficiently long time in order to prevent the joint connection from becoming loose. Usually one lets the holding force FH be effective for as long as it takes for the plasticised regions of the joining zone to solidify again, in particular, one lets the holding force FH be effective for as long as it takes for the temperature of the joining zone to fall below the solidification temperature or below the crystallization temperature or below the glass transition temperature.

The forces can be introduced into the joining partners for example by means of rollers, drums, stamps, contact skids, continuous tracks, holding and guidance matrices etc.

A person skilled in the art will rationally and quickly determine the joining parameters and in particular the pressing and holding forces as well as the respective durations for the particular application.

The supply of the insulating bars and the functional elements and/or the removal of the finished insulating profile can be effected in particular by means of actively driven conveyer belts, rollers, clamping jaws etc.

The method in accordance with the invention permits of a plurality of variations so that the further functional elements can not only be connected by a material bond to the profile body or the rim sections, but can also be connected to the first functional element or the first functional elements. In particular, an insulating profile in accordance with the invention can also be composed of two or more insulating bars, and the respective insulating bar may incorporate two or more profile bodies.

The properties of the product can be easily controlled by means of the layout of the plant and the choice of the processing parameters as well as the selection and the matching of the materials and the geometrical arrangements—in particular of the functional elements. Moreover, re-machining or special finishing steps as well are possible for removing any possible disturbing outflows of smelt, for cutting the bound welded joining partners to length, for marking up the insulating profiles or providing them with covering/protective or functional foils. This can also be accomplished in line.

Insulating profiles produced in accordance with the method in accordance with the invention can be identified accurately. Suitable methods for the analysis are, for example, optical microscopy of the micrograph or the insulating profile itself. Likewise, thermal analyses of the joining zone are possible. Characteristic hereby, are the mass or flow of the smelt in the region of the joining zone, indications of the type of plasticizing process, indications of the location and the type of energy input, indications of the type of guidance of the profiles, indications of the form, geometry and composition of the joining partners.

The present invention relates in particular to the following embodiments:

1. A method for the production of an insulating profile, in particular for the production of window, door and facade components, wherein the insulating profile comprises an insulating bar manufactured from a first polymer material which comprises a profile body as well as a first functional element that extend in the longitudinal direction of the insulating profile, wherein the first functional element is connected in a contact region to the insulating bar by a material bond, wherein, in a first step, both the profile body and the first functional element are each manufactured and provided separately, wherein, in a second step downstream thereof, the profile body and the first functional element are supplied in the longitudinal direction of the insulating bar that is to be formed to an ultrasonic welding device in which the profile body and the functional element are connected to one another by a material bond by the formation of a welded joining, wherein the ultrasonic welding device comprises a welding zone that is equipped with a sonotrode, wherein the sonotrode has a recess in which the functional element is guided during the formation of the welded joining, and wherein, during the formation of the welded joining, the profile body and the functional element are brought together into a predetermined first cross-sectional geometry as seen perpendicularly to the longitudinal direction and thereafter are guided with the predetermined first cross-sectional geometry or, if applicable, with a predetermined second cross-sectional geometry that differs from the first cross-sectional geometry, as seen perpendicularly to the longitudinal direction, until the plastics material of the welded joining has solidified to such an extent that the profile body and the first functional element are fixed with the predetermined cross-sectional geometry.

2. A method in accordance with embodiment 1, wherein the profile body and the first functional element are supplied continuously or intermittently to the ultrasonic welding device.

3. A method in accordance with embodiment 1 or 2, wherein the profile body and/or the first functional element are provided in the form of a continuous material or in lengths.

4. A method according to any of the embodiments 1 to 3, wherein, before going through the welding zone, the profile body and the functional element are positioned relative to each other by means of a first guidance device in a predetermined, optionally variable relative position and fed in the longitudinal direction.

5. A method according to any of the embodiments 1 to 4, wherein, after going through the welding zone, the profile body and the functional element are positioned relative to each other in a predetermined, optionally variable position by means of a second guidance device and fed in the longitudinal direction.

6. A method according to any of the embodiments 1 to 5, wherein the profile body and the functional element are pressed against each other with a respectively predetermined force when going through the welding zone and when going through an optional second guidance device following the welding zone.

7. A method according to any of the embodiments 1 to 6, wherein the first functional element is manufactured with one or more fusible elements which extends/extend in the form of a projection away from a surface of the contact region of the first functional element, wherein the projection or the projections preferably extends/extend approx. 3 mm or less, more preferably approx. 1.5 mm or less away from the surface.

8. A method according to any of the embodiments 1 to 7, wherein the profile body and the first functional element are fed towards each other at an acute angle with respect to the longitudinal direction, wherein the guidance extends at an acute angle at least over sub-regions of the welding zone and possibly the first guidance device and/or the second guidance device.

9. A method according to any of the embodiments 1 to 8, wherein the ultrasonic welding is carried out as a near field welding process, wherein the sonotrode has a direct contact with the first functional element and wherein the sonotrode is preferably arranged at a maximum spacing of approx. 6 mm or less from the profile body.

10. A method according to any of the embodiments 1 to 9, wherein the welding zone has a length of approx. 5 cm to approx. 50 cm and if applicable comprises more than one sonotrode.

11. A method according to any of the embodiments 1 to 10, wherein, in the welding zone, the sonotrode(s) adopts/adopt different angular positions relative to the profile body taken with reference to the longitudinal direction, wherein the angular positions vary continuously and/or in step-like manner and the spacing of the sonotrode(s) with respect to the surface of the insulating bar is thereby decreased in the throughput direction.

12. A method according to any of the embodiments 1 to 11, wherein the welding zone comprises at least one static sonotrode, wherein the static sonotrode is in the form in particular of a grinding sonotrode.

13. A method according to any of the embodiments 1 to 12, wherein the first functional element is formed in the contact region with a shoulder which is in contact with the sonotrode or the sonotrodes in the region of the welding zone.

14. A method according to any of the embodiments 1 to 13, wherein the insulating profile is advanced in the longitudinal direction in the welding zone at a speed of approx. 5 m/min or more, preferably of approx. 10 m/min or more.

15. A method according to any of the embodiments 1 to 14, wherein the period for which the profile body and the first functional element dwell in the welding zone amounts to approx. 100 to approx. 1000 msec., preferably approx. 200 to approx. 800 msec.

16. A method according to any of the embodiments 1 to 15, wherein the sonotrode is operated continuously.

17. A method according to any of the embodiments 13 to 16, wherein the sonotrode is formed with a slot-like or slit-like recess in such a manner that there are formed two parallel end regions of the sonotrode which are in contact with the contact region of the first functional element during the formation of the welded joining.

18. A method according to any of the embodiments 1 to 17, wherein the functional element is formed on the contact region that is to be connected to the profile body with one or more projections which are in the form of energy directors, wherein, in particular, the projection or the projections is/are formed as fusible elements.

19. A method in accordance with embodiment 18, wherein the functional element is provided neighboring the projection or the projections with one or more stop elements which defines/define the cross-sectional geometry that is sought when the functional element and the profile body are brought together, wherein the projection or the projections is/are formed with the function as shoulders.

20. A method according to any of the embodiments 1 to 19, characterized in that the connection between the first functional element or the first functional elements and the profile body by a material bond is effected along the longitudinal direction of the insulating profile continuously, in sections or in point-like manner.

21. A method according to any of the embodiments 1 to 20, wherein, apart from the profile body, the functional elements are also provided in the form of continuous material and, after the production of the connection thereof by a material bond, the insulating profile is cut to a predetermined length, preferably by a cutting or punching or milling process.

22. A method in accordance with embodiment 21, wherein the continuous materials are provided on rollers, spools or reels.

23. A method in accordance with embodiment 21, wherein, before the production of the connection by a material bond, the profile body and/or the functional elements is/are provided in lengths.

24. An insulating profile producible in accordance with a method according to any of the embodiments 1 to 23, wherein the profile body comprises a region extending in the longitudinal direction of the insulating profile which is formed substantially planar.

25. An insulating profile in accordance with embodiment 24, wherein the profile body comprises through-openings having predetermined and in particular regular spacings.

26. An insulating profile in accordance with embodiment 24 or 25, wherein the insulating bar is formed with at least one rim section which comprises a connecting element, wherein the connecting element takes the form in particular of a roll-in head for connection to metal profiles.

27. An insulating profile according to any of the embodiments 24 to 26, wherein the welded joining in the form of a material bond between the profile body and the first functional element exhibits a strength of approx. 2 N/mm or more, preferably approx. 5 N/mm or more, particularly preferred, approx. 10 N/mm or more.

28. An insulating profile according to any of the embodiments 24 to 27, wherein the insulating bar comprises second and possibly further functional elements formed integrally with the profile body.

29. An insulating profile according to any of the embodiments 24 to 28, wherein the first functional element or the first functional elements is/are selected from elements incorporating panel elements which are formed such as to be planar, curved, in particular part-circular, branched or bent in cross section and/or a cavity or a plurality of cavities, wherein the functional element or the functional elements preferably comprises/comprise a section which is arrow-like, hook-like or is T-shaped in cross section relative to the longitudinal direction.

30. An insulating profile according to any of the embodiments 24 to 29, wherein the first functional element or the first functional elements forms/form a plurality of cavities, which are optionally closed, in the longitudinal direction of the insulating profile, wherein in particular, the cavities are formed successively in a line.

31. An insulating profile according to any of the embodiments 24 to 30, wherein the profile body and the first functional element or the first functional elements is/are produced from a weldable polymer material that is preferably based on a thermoplastic polymer which is selected from polyamides, polyesters, polyolefins, polyketones, vinyl polymers, polyethers, polycarbonates, polyphenylene sulfides and their copolymers or blends of these materials.

32. An insulating profile in accordance with embodiment 31, wherein the polymer material of the first functional element or the first functional elements is selected such that it is compatible with the polymer material of the profile body.

33. An insulating profile according to any of the embodiments 24 to 32 wherein the surface and/or a core of the first functional element or the first functional elements is partly metal-coated or metalized or is metallically treated 34. An insulating profile according to any of the embodiments 24 to 33, wherein the polymer material of the profile body and/or the first functional element is fiber-reinforced, in particular, glass-fiber reinforced.

BRIEF DESCRIPTION OF THE DRAWINGS

These and further advantages of the invention will be explained in more detail in the following with the aid of the drawings. These show in detail:

FIGS. 7A and 7B schematic illustrations of sonotrodes that are to be used in accordance with the invention;

FIG. 8 a first variant of an ultrasonic welding device that is to be used in accordance with the invention;

FIGS. 12A and 12B an embodiment of the ultrasonic welding device in accordance with FIG. 8 in the form of a perspective illustration as well as sectional views of different sections of the device;

FIGS. 15 to 17 further variants of functional elements for the production in accordance with the invention of insulating profiles including a micrograph of a connection by means of a material bond; and FIG. 18 a variant of a testing device for insulating profiles for the determination of the strength of a functional element adjoined in accordance with the invention.

DETAILED DESCRIPTION OF THE DRAWINGS

Figure 1:
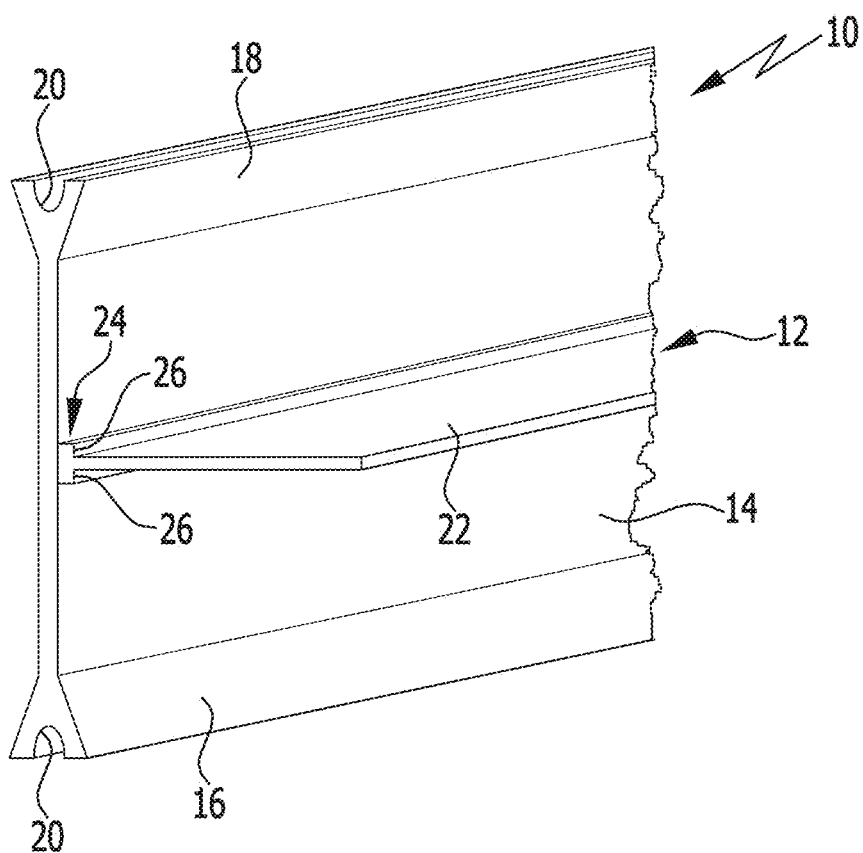
FIG. 1 a first embodiment of an insulating profile produced in accordance with the invention.

FIG. 1 shows schematically a first embodiment of an insulating profile 10 produced in accordance with the invention which is based on an insulating bar 12 with a planar profile body 14. Rim sections 16, 18 which are in the form of so-called roll-in heads are adjoined to the profile body 14. The insulating bar 12 is manufactured from a first polymer material.

The rim sections 16, 18 run in the longitudinal direction of the insulating profile 10 in accordance with the invention and are formed at the outer edges of the profile body 14 which are spaced transversely to the longitudinal direction. The production of such insulating bars 12 from a polymer material with a high degree of accuracy of the cross-sectional geometry and high linearity in one extruding step is economically possible without a great deal of expenditure. The extruding tools required for the process are of little complexity and are also available relatively economically.

When processing the insulating profile in accordance with the invention in the form of metal-plastics composite profiles, the rim sections 16, 18 designed as roll-in heads can be pushed into corresponding slots of the metal profiles and be connected thereto in shear resistant manner if necessary in the course of a so-called roll-in step.

Moreover, the rim sections 16, 18 may comprise a groove 20 into which a so-called fusible wire (not shown) can be laid. Preferably, the fusible wire is held in the groove 20 in positive-fitting and/or force fitting manner. After the production of the roll-in connection, the fusible wire can be activated by a heating process, e.g., during a powder-coating firing process, for the purposes of further securing the shear-resistant connection of the insulating profile to the metal profile.

Furthermore, the insulating profile 10 comprises a separately manufactured first strip-like functional element 22 which can be connected to the profile body 14 by a material bond by means of an ultrasonic welding process in accordance with the invention. In this exemplary embodiment, the first functional element 22 is manufactured from a second polymer material which can be identical to the first polymer material or different therefrom. For the materially bonded connection, it is important that in the case of the use of different polymer materials these be compatible with one another. Numerous examples of mutually compatible polymer materials are to be found inter alia in the Saechtling Kunststoff Taschenbuch, 30th Edition, ISBN 978-3-446-40352-9, pages 739 and 740 (Table 8.5 and Table 8.6).

Suitable above all, are combinations which are qualified in Table 8.5 as "mixable or compatible with one another" or are characterized by the symbols "+" and "O" in Table 8.6.

For the purposes of simplifying the materially bonded connection, the first functional element 22 is formed at one its boundary regions with a contact region 24 which has a T-shaped form in this embodiment so that shoulders 26 protrude on both sides of the functional element 22, the function of these shoulders will be described in more detail in the context of the description of the ultrasonic welding process in accordance with the invention in conjunction with both FIGS. 2A and 2B as well as with FIG. 7A.

Economical manufacturing methods for manufacturing the first functional element 22 are also at the disposal of the person skilled in the art, for example the extrusion process in the event that the first functional element is made from a polymer material. Likewise, the functional element can come from a sheet material of large surface area (e.g., a blown film, calendared plate or foil) which is then suitably cut, punched and/or reshaped. The contact region can also be added to a planar base body for example by an extrusion joining process.

Figure 2A:
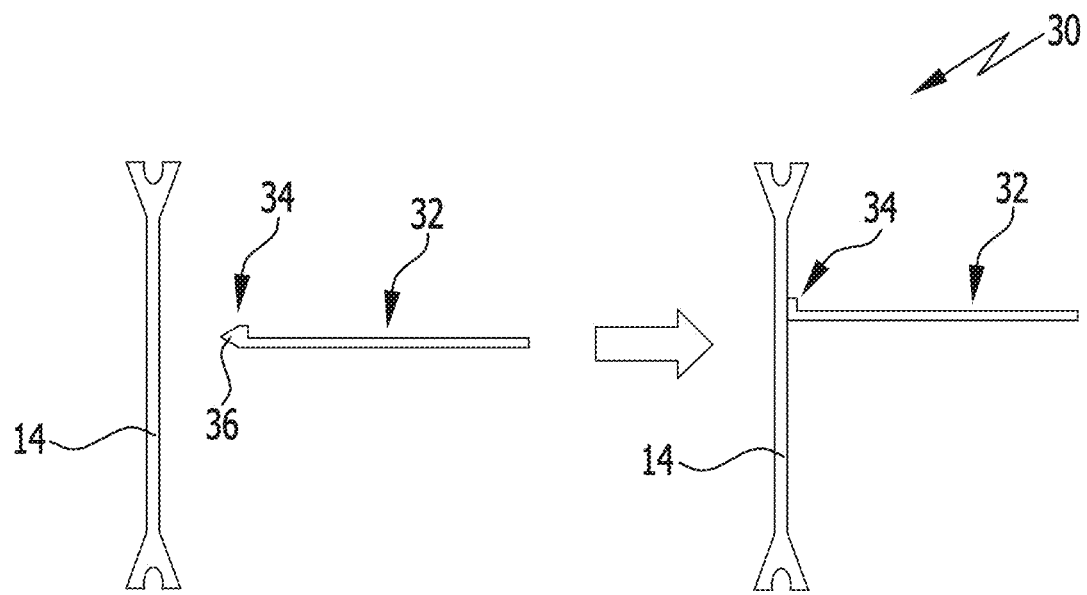
FIGS. 2A and 2B two further variants of the first embodiment of the insulating profile produced in accordance with the invention.
Figure 2B:
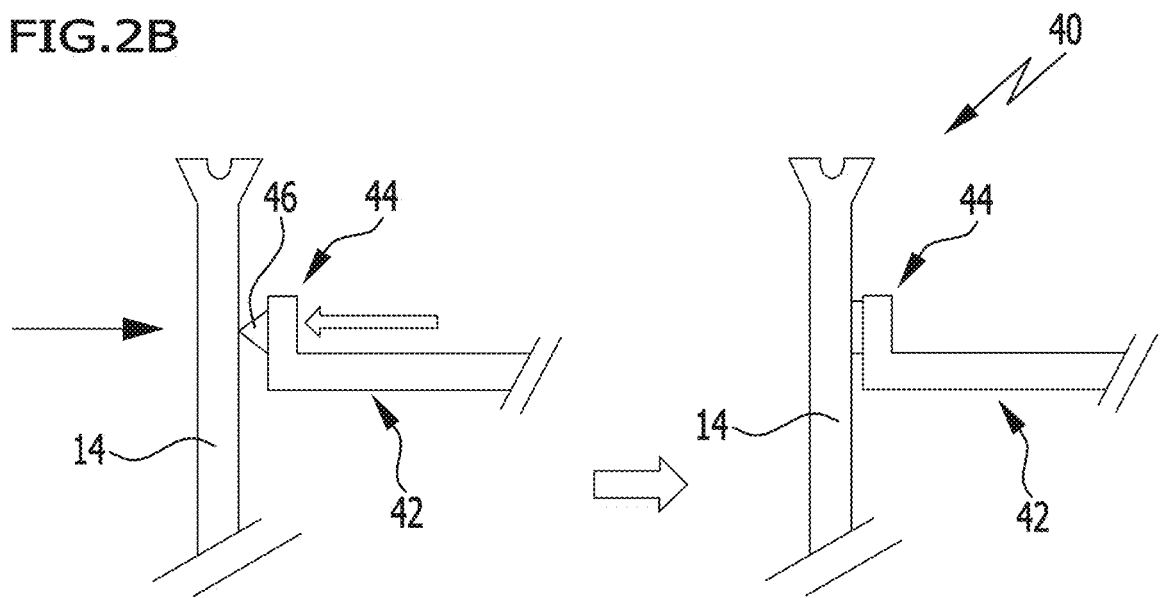

Variants of insulating profiles 30 or 40 in accordance with the invention are shown in FIGS. 2A and 2B, wherein the respective planar profile body 14 of the insulating bar 12 is again connected substantially centrically relative to its transverse direction to a first strip-like functional element 32 or 42 in accordance with the invention by a material bond by means of an ultrasonic welding process.

The first functional elements 32 and 42 of the insulating profiles 30, 40 are each manufactured separately from the insulating bar 12 or its profile body 14 and are subsequently connected to the insulating bar 12 or its profile body 14 in accordance with the invention by a material bond by means of an ultrasonic welding process.

In the exemplary embodiment of FIG. 2A, the first functional element 32 is again produced from a polymer material which is compatible if not identical with the polymer material of the profile body 14.

The first functional element 32 has a contact region 34 at one of its boundary regions which is L-shaped and is formed with a projection 36 that is of triangular shape in cross section. This projection 36 of the contact region 34 functions during the ultrasonic welding process as a so-called energy director which melts and is compressed during the process of connecting the functional element 32 (fusible element) by means of a material bond.

The first functional element 42 of the insulating profile 40 of FIG. 2B can be produced from a material which does not need to be compatible with the first polymer material of the insulating bar 12 and in particular, could even be a ceramic or metallic material, e.g., in the form of a metal strip or a punched metal sheet.

For the purposes of the materially bonded connection to the insulating bar 12, the first functional element 42 has a contact region 44 that is constructed with an L-shape and is provided with a projection 46 which consists of a second polymer material that is compatible with the first polymer material.

During the process of connecting the first functional element 42 to the profile body 14 by a material bond, the projection 46 is melted and compressed.

The projection 46 which again functions as a so-called energy director during the ultrasonic welding process is connected to the contact region 44 of the first functional element by a material bond and/or in positively-fitting manner.

The connection of the contact region of the first functional elements 22, 32 and 42 to the profile body 14 by a material bond is effected in each case without any addition of auxiliary material.

The connection between the insulating bar 12 or its profile body and the first functional elements 22, 32 or 42 can, in accordance with the invention, be produced continuously or with predetermined and in particular regular spacings (point-like or in sectional manner).

The stability of the connection between the insulating bar 12 and the first functional element 22, 32 or 42 must frequently be merely that which is required for the insulating profile 10, 30 or 40 to reliably retain its shape during the transportation and processing actions up to the metal-plastics composite profile, since, in the assembled state, the first functional element 22, 32 or 42 shown in FIG. 1A as well as 2A and 2B frequently does not have to accommodate any forces and for example, only serves for suppressing convection currents in the interior of a metal-plastics composite profile. Functional elements of this type which are also known as flags typically project by some centimeters from the surface of the insulating bar.

Figure 3:
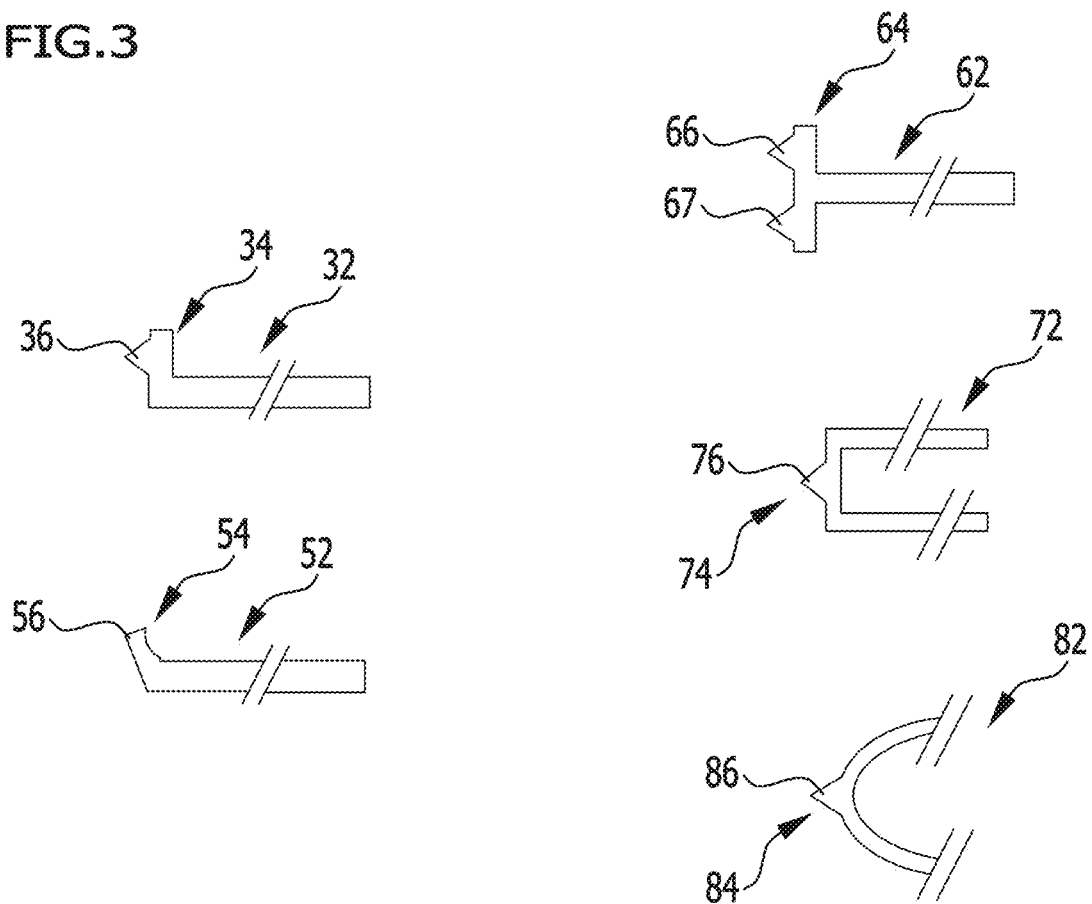
FIG. 3 a further variant of the first embodiment of the insulating profiles in accordance with the invention.

FIG. 3 shows further variants of first functional elements in comparison with the functional element 32 used in FIG. 2A.

The first functional element 52 has a slightly cranked contact region 54 the point 56 of which is formed as a projection which can melt during the ultrasonic welding process and be compressed during the formation of the connection to the associated insulating bar by means of a material bond.

The first functional element 62 of FIG. 3 has a T-shaped configuration in its contact region 64 upon which two projections 66, 67 serving as energy directors are formed. This type of contact region has the advantage that the smelt developing during the ultrasonic welding process can, at least for the most part, be accommodated in the gap between the projections and so an optically attractive welded connection between the first functional element and the associated profile body can be formed. In addition, the contact area being formed can thereby be enlarged if so wished.

Additionally hereby, the energy input of a sonotrode is led directly and in particular linearly, from the shoulders to the points of the fusible elements which results in improved efficiency when carrying out the process.

Based on the example of the first functional elements 72 and 82, it is intended to demonstrate that, in accordance with the invention, even more complexly constructed first functional elements can be used whereby here too, the contact regions 74 and 84 are also provided with respective projections 76 and 86 which are melted and compressed during the ultrasonic welding process for the purposes of forming a materially connection.

Figure 4:
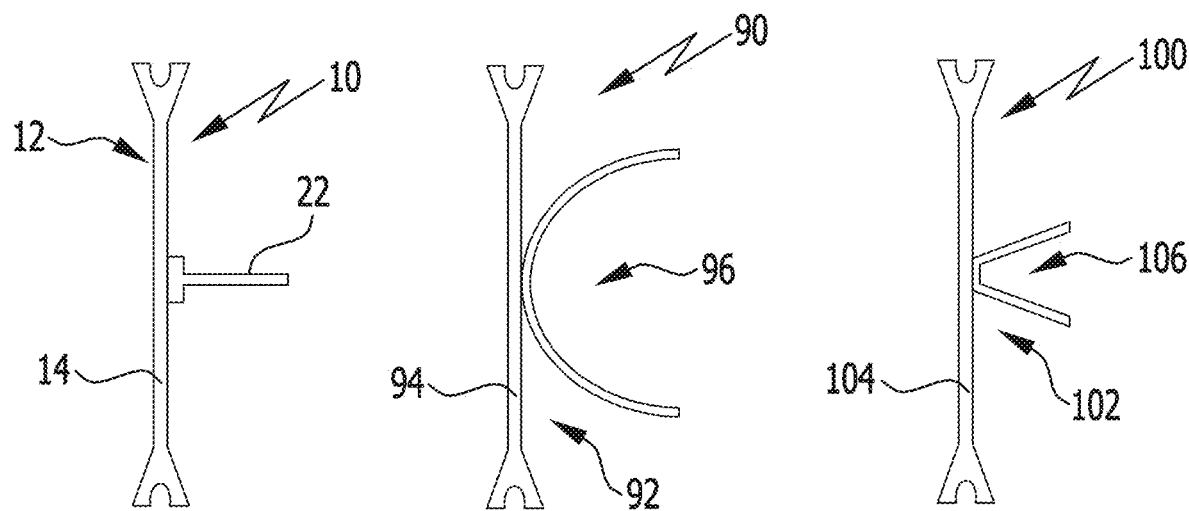
FIGS. 4 and 5 different exemplary variants of the production of insulating profiles in accordance with the invention.

FIG. 4 shows further possible variations in regard to the first functional element compared with the insulating profile 10 of FIG. 1.

In the variant of the insulating profile 90 of FIG. 4, a first functional element 96 of semicircular cross section is connected to a profile body 94 of an insulating bar 92 by a material bond by means of ultrasonic welding.

In the case of the insulating profile 100 shown in FIG. 4, a first functional element 106 of substantially U-shaped to V-shaped cross section is connected to a profile body 104 of an insulating bar 102 by a material bond by means of ultrasonic welding.

It is clear that for the variants 90 and 100 of the first functional elements, sonotrodes which are matched geometrically to the cross section of the functional elements must be used so that despite the protruding functional zones of these elements a satisfactory welded joining is attainable.

Figure 5:
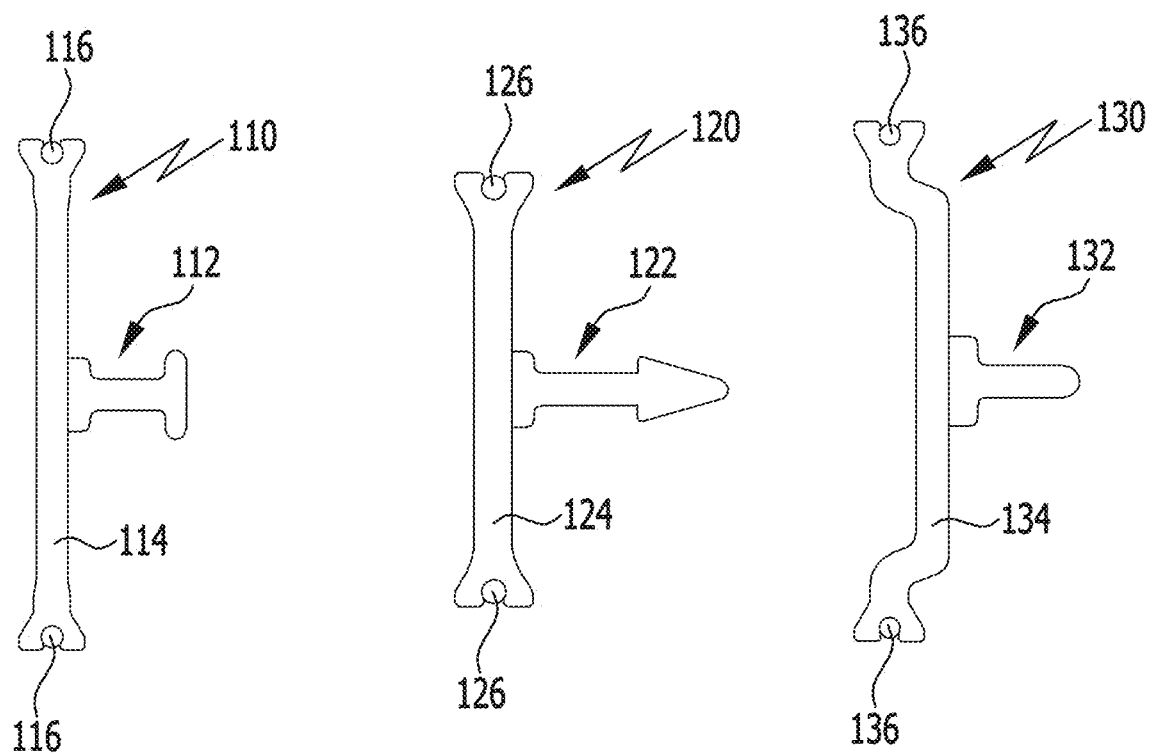

FIG. 5 shows further variants of insulating profiles 110, 120 and 130 produced in accordance with the invention wherein, in accordance with the invention, first functional elements 112, 122 and 132 are connected to the respective profile bodies 114, 124 and 134 by a material bond. Thereby, the respective first functional elements 112, 122 and 132 have at their respective free ends a T-shape, an arrow shape or take the form of a spike (so-called noses or short flags)

Moreover, the profile body 134 is cranked at its boundary regions which are provided with roll-in heads. The roll-in heads of the insulating profiles 110, 120, 130 are each provided with grooves (in a similar manner to those shown in FIG. 1) which accommodate a respective so-called fusible wire 116, 126 and 136 in positive-fitting manner.

Figure 6:
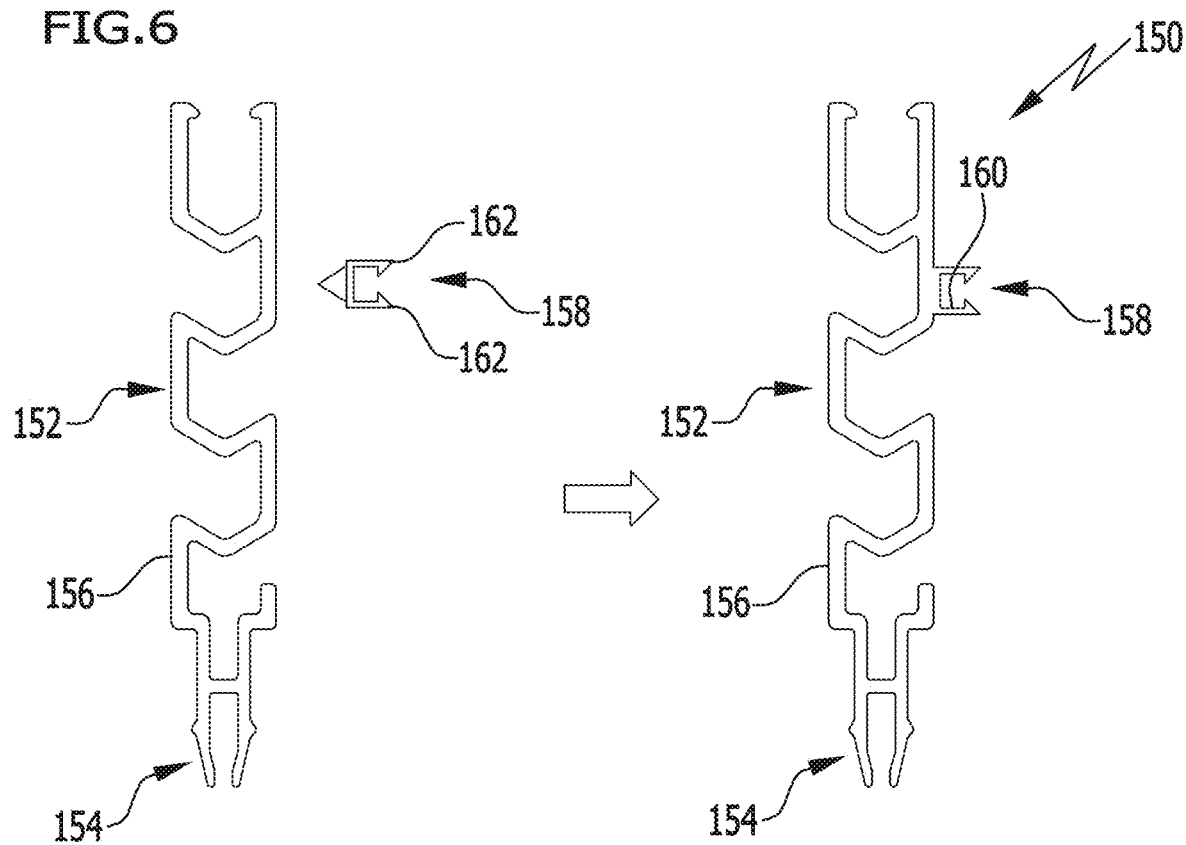
FIG. 6 a further variant of an insulating profile produced in accordance with the invention.

FIG. 6 shows an insulating profile in the form of a facade spacer 150 having an insulating bar 152 of meandering shape which has a rim section in the form of an anchorage projection 154 at one end of its profile body 156. The insulating bar 152 is typically manufactured in one-piece in an extrusion step and can, within the framework of the present invention, be provided with one or more functional elements. In the example of FIG. 6, a U-shaped holding profile 158 serving as the first functional element is connected to the profile body 156 by a material bond. The functional element 158 has an accommodating groove 160 in its U-shaped cross section which is bounded on both sides by a respective projection 162. The projections 162 each comprise at their free ends a latching projection that is directed towards the interior of the groove 160.

The holding profile 158 can for example accommodate and fix sealing elements, e.g., in the form of sealing lips, and can be attached to the profile body 156 of the insulating bar 150 by a material bond at one or more positions. Self-evidently, the functional elements (here, the holding profile 158) can not only be placed on just one side of the facade spacer 150, but also on the mutually oppositely located sides thereof and can be connected by a material bond to the profile body 156.

Figure 7A:
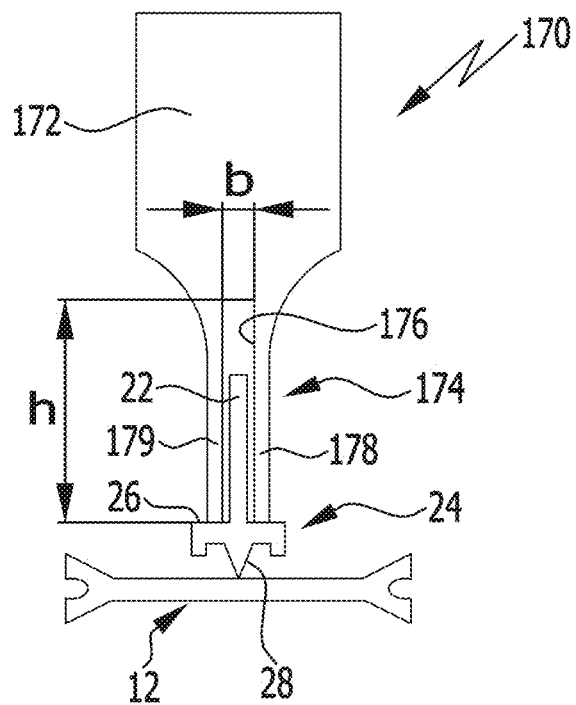

FIG. 7A shows a sonotrode 170 having a slot-like or slit-like recess that is usable with the method in accordance with the invention and which is held at the upper end 172 thereof in an ultrasonic welding device (not shown). Likewise not shown, is the requisite counter piece (anvil) at the lower surface of the insulating bar 12 upon which the latter abuts and over which the insulating bar is fed or pulled during the welding process. The aspect ratio of the slot or slit width b to the height h will preferably amount to approx. 5 or more. First functional elements the extent of which perpendicularly to the surface of the insulating bar is sufficient can also be processed therewith in order to function as so-called flags. Surprisingly, such a large aspect ratio does not noticeably impair the functionality of the sonotrode.

Adjoining the upper end 172 is the lower end 174 of the sonotrode 170 that is formed with a slot or slit-like recess 176 in which—as shown in FIG. 7A—a first functional element, here a functional element 22, is accommodated substantially entirely up to its contact region 24 in the recess 176.

The wall elements 178, 179 bounding the recess 176 at the lower end 174 of the sonotrode 170 end at the upper side of the contact region 24 of the first functional element 22. The positioning of the sonotrode 170 is effected in such a way that, in the presently shown portion of the welding device, the energy-injector 28 of the first functional element 22 is located in physical contact with the insulating bar 12.

A detail of the sonotrode 170 is shown in FIG. 7B wherein a first functional element 180 is entirely accommodated right up to its contact region 182 in the recess 176. Adjacent thereto, is shown a variant of a sonotrode 190 comprising a recess 192 which is of larger dimensions than the recess 176 and consequently can also accommodate first functional elements 194, 196 which, spaced away from their respective contact regions 198 and 199, have a different and more developed geometry than the first functional element 180.

A first variant of a device 200 for carrying out the method in accordance with the invention for the production of insulating profiles is illustrated schematically in FIG. 8 and it comprises a first guidance zone 202 in which the separately produced elements of the insulating profile that are to be connected to one another, i.e., the insulating bar 12 on the one hand and the first functional element 22 on the other hand for example, are fed towards one another with a predetermined orientation by a first guidance device (not shown) of the subsequently arranged welding zone 204 and the ultrasonic welding device accommodated therein.

Adjoining the welding zone 204, there is shown a holding zone 206 which conveys the components that were joined together and connected by a material bond in the welding zone 204 out from the welding zone 204 in the form of a finished insulating profile 10. A second guidance device (not shown) is placed in the holding zone 206 for this purpose.

In FIG. 8, a sonotrode forming the welding zone 204 is arranged at an acute angle α with respect to the insulating bar 12, for example, at an angle of less than approx. 5° and in particular less than approx. 3° so that for the free ends of the sonotrode, between which is arranged the recess in which the first functional element is fed, the increased melting of the projections functioning as energy-injecting emitters on the contact region 24 of the first functional element 22 results in a closer approach to the surface of the insulating bar 12. This is illustrated schematically in the two sectional drawings (a) and (b) attached to FIG. 8. Due to this geometry, the material of the energy-injector 28 is continuously melted and, at the same time, compressed in such a way that it fills the cavities located between the shoulders 26 with the outflow of the smelt and forms a compressed region which is indicated by the reference symbol 29 in FIG. 8 in the Detail (b).

Figure 9:
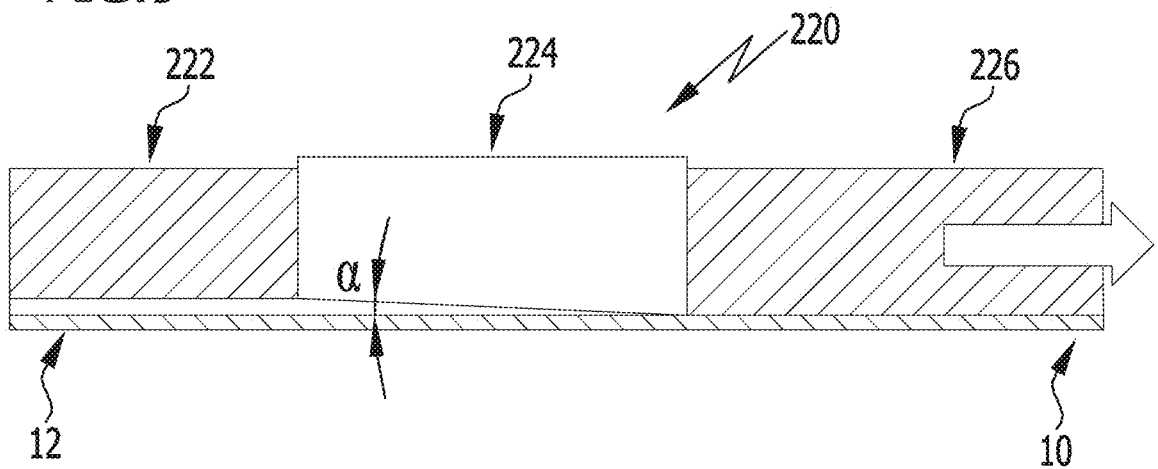
FIGS. 9 to 11 further variants of ultrasonic welding devices that are to be used in accordance with the invention.

FIG. 9 depicts a second variant of a device 220 for carrying out the method for the production of insulating profiles in accordance with the invention. Here, a first guidance device (not illustrated) by means of which the insulating bar 12 and the first functional element 22 are fed synchronously and preferably continuously to the fusion zone 224, which contains a sonotrode, is provided to a first guidance zone 222.

The sonotrode 224 is formed parallel to the transportation path and the extent of the insulating bar 12, whereby however, the lower surface of the sonotrode 224 runs at an acute angle α with respect to the surface of the insulating bar 12 so that, upon passing through the welding zone 224, there results a geometrical approach of the first functional element 22 and its contact region 24 to the surface of the insulating bar 12. As seen in cross section, configurations as shown in FIGS. 8 (a) and (b) again result.

Adjoining the welding zone 224, there is provided a holding zone 226 incorporating a second guidance device (not shown) which holds the elements of the insulating bar 12 and the first functional element 22 that are connected to one another by a material bond in the desired cross-sectional geometry so that the welding seam formed thereby can cool and in the end there will be obtained a manipulable insulating profile 10 having the desired geometry.

Figure 10:
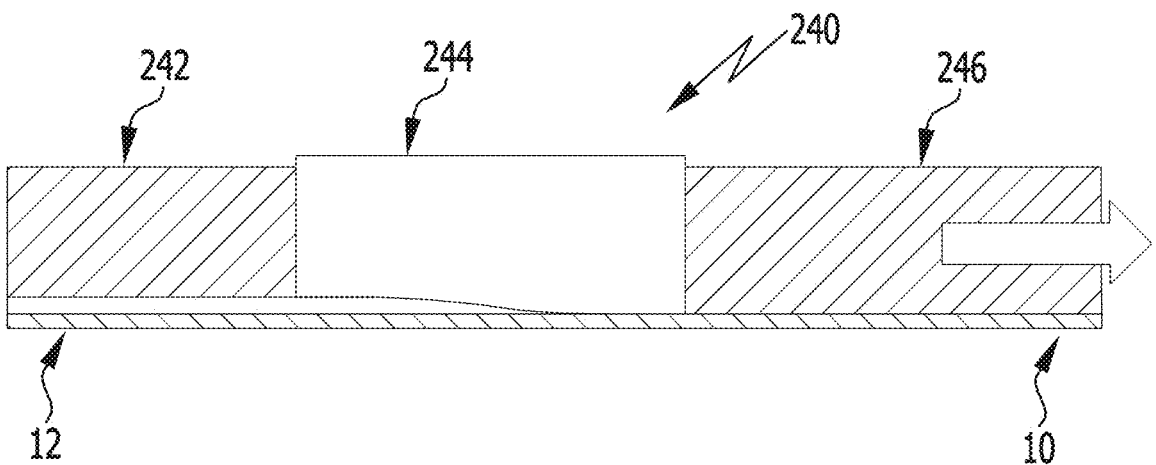

A third variant of a device 240 for the production of an insulating profile in accordance with the invention is shown in FIG. 10 in which a first guidance device (not shown) is again used in the first guidance zone 242 in order to supply a first functional element of predetermined geometry with respect to the insulating bar 12 to a welding zone 244 (sonotrode).

Here too, the sonotrode 244 is again directed horizontally but is formed with varying geometry on the lower surface thereof so that in turn, when passing through the welding zone 244, there results an approach of the first functional element to the insulating bar 12 as corresponds once again to the two illustrations of FIGS. 8 (a) and (b). Following the welding zone 244 in this variant too, provision is made in the holding zone 246 for a second holding device (not shown) which guides the combination of an insulating bar 12 and a first functional element in the form of an insulating profile 10 that are connected by a material bond and fixes it with the appropriate geometry until the welding seam cools off.

Figure 11:
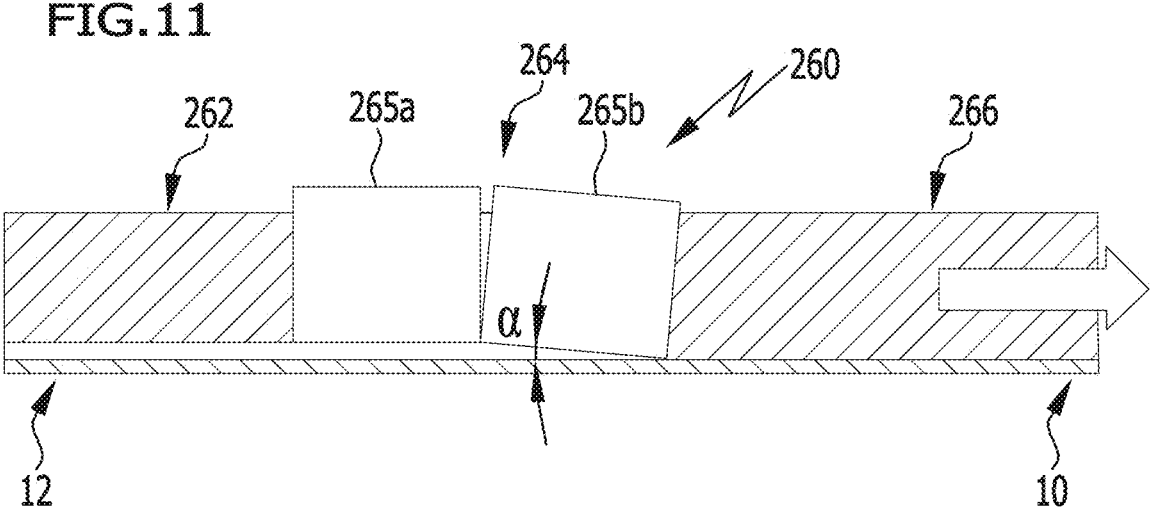

A fourth variant of a device 260 for the production in accordance with the invention of an insulating profile is shown in FIG. 11 in which an insulating bar 12 as well as a first functional element are again supplied together in a predetermined geometrical arrangement relative to each other to a welding zone 264.

In the case of this exemplary embodiment of a device 260 for carrying out the method in accordance with the invention, the welding zone 264 is divided into two sections that are formed by the two sonotrodes 265a and 265b.

The sonotrode 265a is arranged to be substantially horizontal, i.e., to run to a large extent parallel to the direction of conveyance of the insulating bar 12 and the first functional element and, by inputting energy, ensures that the energy-injector of the first functional element is melted. In the second phase of the fusion zone 264, a shift in the position of the contact region of the first functional element with respect to the surface of the insulating bar 12 is achieved by means of a sonotrode 265b which is arranged at an angle α to the transportation direction of the insulating bar 12 so that, upon transference from the welding zone to a second guidance device (not shown) in a holding zone 266, the desired cross-sectional geometry of the insulating profile 264 that is to be produced is attained once again. The arrangement of an insulating bar 12 and a first functional element 22 before and after the welding process again corresponds to the two illustrations of FIGS. 8 (a) and (b).

Even if in the course of the description of the methods in accordance with the invention in conjunction with FIGS. 8 to 11 it has always been assumed that the second guidance device in the respective holding zones 206, 226, 246, 266 ensures that the cross-sectional geometry 204, 224, 244, 264 obtained in the welding zone is retained until the welding seam has cooled down sufficiently and thereby hardened or solidified, it can quite easily be envisaged that a change of cross-sectional geometry will be produced in the second guidance device so that the first functional element 22 no longer protrudes perpendicularly from the insulating bar 12, as is shown in FIG. 8 (b), but is directed at an angle differing therefrom so that the welding seam then solidifies with an inclined configuration and hence a configuration of the insulating profile 12 and the first functional element 22 differing from the illustration in FIG. 8 (b) will be obtained.

FIG. 12A depicts a device 300 for carrying out the method for the production of insulating profiles in accordance with the invention in the form of a perspective view. Here, the first and the second guidance device for the guidance zone and the holding zone are now also illustrated.

The device comprises a first guidance device 302 in the form of a matrix in which the insulating bar 12 and the first functional elements 22 being supplied to the device 300 are held in a predetermined geometry relative to each other and are conveyed in the direction towards the following welding zone 304. The relative arrangement of the insulating bar 12 and the first functional element 22 in this phase is shown in the sectional views (a) and (b) from which it is also apparent that, in the case of the first guidance device 302, there is provided a slit-like recess 310 in which the first functional element 22 is guided.

Preferably, in the case of this recess 310 of the first guidance device 302, the contact region 24 of the first functional element 22 is, for the most part, also accommodated by the recess 310 whilst the contact region 24 is gradually brought closer to the upper surface of the insulating bar 12.

In the fusion zone 304 following the first guidance device 302 which corresponds to a sonotrode in the region (c) to (d), the first functional element 22 is fed into a recess 312 of the sonotrode 304, but nevertheless, with the difference here that the contact region 24 of the first functional element 22 is located outside of the body of the sonotrode 304 so that an unhindered approach of the contact region 24 to the surface of the insulating bar 12 can be effected whilst compressing the energy director simultaneously with the continuous input of ultrasonic welding energy, as is shown in the cross-sectional Illustration (d) at the end of the welding zone 304.

Following the welding zone 304, the insulating bar 12 that is connected to the first functional element 22 by a material bond is guided in a second guidance device 306 with the desired final cross-sectional geometry. Here once more, the guidance device 306 is also provided with a recess 314 which substantially accommodates the first functional element 22.

As shown here, the body of the guidance device 306 can be a rigid matrix, but equally, it could also be realized differently, for example, in the form of pressing rollers Finally, following its withdrawal from the second guidance device 306, the insulating profile 10 is taken over by a conveyer device 308 and pulled out of the device.

The transference of the joining partners from the guidance zone to the welding zone in the region (b)-(c) as well as the transference of the insulating profile from the welding zone to the holding zone in the region (d)-(e) can be effected over short distances of just a few millimeters or a few centimeters without special guidance or be transferred unguided, e.g., by means of air gaps.

Figure 13:
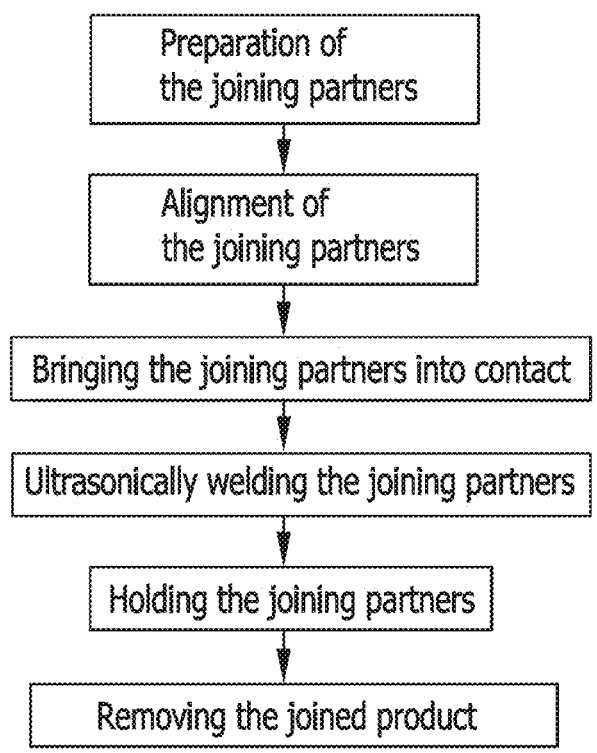
FIG. 13 a schematic illustration of a method in accordance with the invention for the production of an insulating profile in accordance with the invention.

The individual processing steps are illustrated once more in FIG. 13 in the form of a flow chart, wherein the expression joining partner 1 and 2 stands for the insulating bar 12 and the first functional element 22 respectively.

The typical parameters for the process of carrying out the method in accordance with the invention can be outlined as follows:

A feed-through speed or else a withdrawal speed of the finished insulating profile 10 typically lies within the range of approx. 10 m/min or more, whereby significantly higher values are also realizable, e.g., of approx. 15 m/min or more, or approx. 30 m/min or more.

The durations of the periods for which the profiles dwell in the welding zone that are predetermined by the aforementioned withdrawal speeds are heavily dependent on the material and the geometry and typically amount to approx. 0.2 to approx. 0.6 seconds. If a higher energy input should be necessary, then one can work with somewhat lower withdrawal speeds (thus resulting in a greater duration in a zone) so that, upon passing through the welding zone, a higher input of energy (taken with reference to the unit of length of a welding seam) can take place. In general, with significantly higher withdrawal speeds, an extension of the welding zone becomes necessary, for example by adding further sonotrodes, something that typically can easily be realized however by the method in accordance with the invention, as is also apparent for example from the perspective illustration of FIG. 12A.

The merging of the insulating bar and the first functional element is preferably effected by the feed motion on the one hand and the geometrical approach of the two components, the insulating bar 12 and the first functional element 22 on the other hand, whereby the force with which the two components are pressed against each other is given by the material properties, the predetermined withdrawal speed, the height of the fusible element and the geometrical contour of the sonotrode in the direction of travel of the profile. Due to the predetermined position of a static sonotrode or the geometrical contour thereof in the direction of travel of the profile, there is realized a so-called "path-controlled welding" process, to which, in accordance with the invention, preference is given compared with force-controlled welding since the tolerances can then be held within closer limits.

The duration of the pressing process, i.e., the period for which the insulating profile connected by a material bond is guided and stabilized by the second guidance device, is conceived on the basis of the time which is required in order to let the welding seam solidify and so make the product as such manipulable. Typically here, durations of approx. 0.2 to approx. 1 second are sufficient since the plasticizing process is locally very limited and the amount of heat that has to be removed thereby can be kept relatively small.

The contact region of the first functional element is shown once more and is discussed in a broad palette of different configurations in the following FIGS. 14 to 17.

Figure 14:
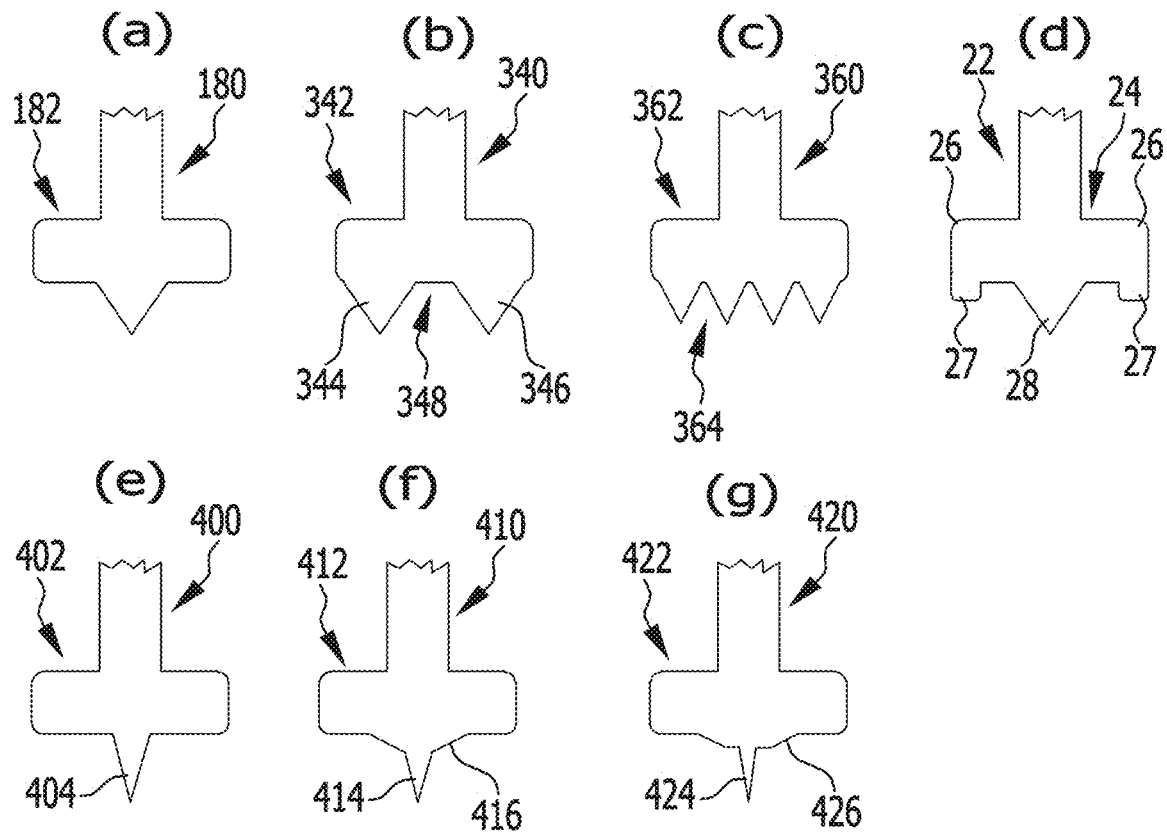
FIG. 14 several variants of functional elements.

In the first place (Illustration (a)), FIG. 14 shows the contact region 182 of the first functional element 180 as has already been discussed in the context of FIG. 7B. In the Illustration (b) of FIG. 14, there is shown a first functional element 340 having a contact region 342 which is formed with two protruding projections 344, 346 which both function as energy directors and which define therebetween a cavity 348 in which at least a part of the resulting smelt of the material of the energy directors 344, 346 can be accommodated during the welding process.

The Illustration (c) of FIG. 14 shows a first functional element 360 with a contact region 362 at the free end of which are formed four projections 364 which have a triangular cross section and function as energy directors and which form three cavities therebetween in which melted material of the contact region 362 can be accommodated during the welding process.

For comparison, the Illustration (d) of FIG. 14 again depicts the first functional element 22 with the contact region 24 and the energy director 28 in the form of a triangle-shaped projection that is arranged in the contact region. To expand, the contact region 24 has—compared with the embodiment depicted in the Illustration (a) of FIG. 14—two further projections 27 which each form a stop and which define the relative position or the cross-sectional geometry of the insulating profile that is to be obtained during the formation of the welded connection.

Here too, a cavity volume is again provided underneath the shoulders 26 on both sides of the energy director 28 in which the melted material thereof can be accommodated during the ultrasonic welding process so that an optically attractive connection between the first functional element 22 and an associated insulating bar can be obtained. The cavity volume is bounded on both sides by the stop elements 27.

The Illustration (e) of FIG. 14 shows a further alternative of a first functional element 400 in which a contact region 402 is equipped with a projection 404 having a triangle-shaped cross section that serves as an energy director. The cross-sectional area of this energy director 104 is smaller than that of the energy director 28 of Illustration (d) or else of the energy director 344, 346 of Illustration (b) of FIG. 14.

Typically here, due to the smaller volumetric fraction that can be compressed during the welding process, a hollow volume does not necessarily have to be provided for accommodating the smelt, but rather, the smelt will distribute itself substantially evenly over the lower surface of the contact region 402 of the first functional element 400. Hereby, the ensuing smelt volume is smaller, but the energy required thereby in order to plasticize the volume also sinks and the welding process can thus proceed with a greater feed speed.

In a similar way, in illustration (f) of FIG. 14 wherein the first functional element 410 and the contact region 412 thereof that is shown there is conceived in such a way that the volume of the energy director 414 is smaller by virtue of a smaller cross-sectional format and so care has been taken that the liquefied fusion material of the energy director 414 cannot emerge laterally of the contact region 412. Moreover, the energy director 414 is also arranged on a conically shaped surface structure 416 of the contact region 412 so that a volume between the contact region 412 and the surface of the insulating bar (not shown here) remains on both sides of the energy director 414 following the melting thereof, said volume being able to accommodate the smelt of the material of the energy director 414 in problem-free manner.

A slightly modified variant thereof is shown in the illustration (g) of FIG. 14 on the basis of a first functional element 420 in which the contact region 422 beside the energy director 424 is likewise equipped with a conical structure 426, whereby here, the cross section of the energy director 424 is kept still smaller than that in the illustration (0 so that the ensuing smelt volumes will remain between the contact region 422 and a surface of the insulating bar (not shown) with a higher degree of certainty here. Thereby, the plateau of the conical structure 426 functions as a kind of stop element.

In the case of the geometries of the respective contact regions 412 and 422 shown in Figures (f) and (g), it is also conceivable that the conical projections 416, 426 be designed such that, subsequent to the plasticizing process in the joining zone, the geometry ensuing from the passage through the welding zone will be altered again whilst still in the hot plasticized state in a subsequently located step—for example in an appropriately formed second guidance device—in such a manner that an inclination of the first functional element 410, 420 with respect to the surface of the insulating bar (here not shown) that deviates from the perpendicular is obtained.

Figure 15:
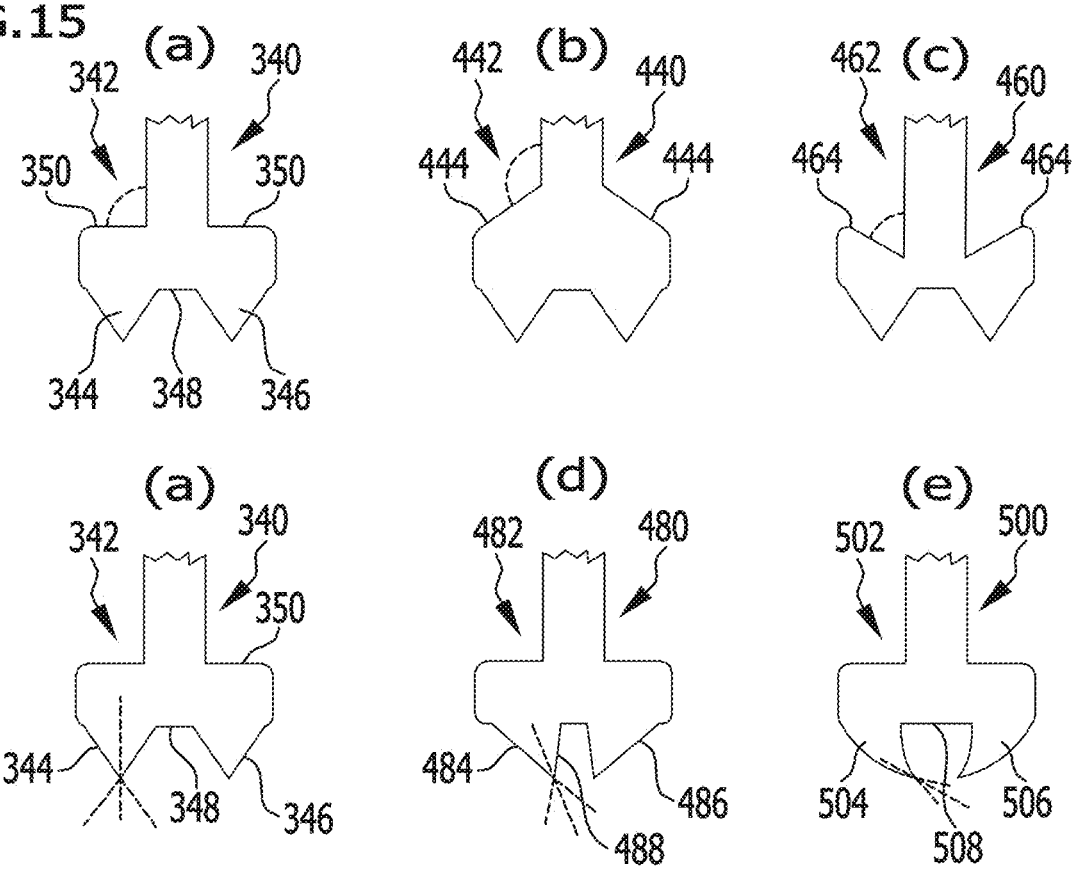

FIG. 15 likewise shows a plurality of variants of the contact regions of the first functional elements commencing from the variant of a contact region 342 that has already been shown in Illustration (b) of FIG. 14. In a contact region of this type, the contact surfaces for the sonotrode formed by the shoulders 350 are arranged substantially orthogonally with respect to the plane for the introduction of force and enable secure and defined guidance of the first functional elements within the region of the fusion zone.

In the case of the variant of the Illustration (b) of FIG. 15, the first functional element 440 comprises a contact region 442 in which the shoulders form contact areas for the sonotrode which adopt an obtuse angle with respect to the plane for the introduction of force. Such an arrangement of the contact region stabilizes the geometry of the contact region on the one hand, especially during the introduction of large forces via the sonotrode, but on the other hand require an adjustment of the sonotrode so that the regions which are in contact with the shoulders and which introduce force into the contact region maintain their geometry to an adequate degree during the welding process and ensure a targeted introduction of force.

The latter problem in particular is countered by the arrangement of the contact region 462 of the first functional element 460 in which the contact areas formed by the shoulders 464 are at an acute angle with respect to the plane for the introduction of force. Here, a process of centering of the sonotrode tips which come into contact with the contact areas takes place so that the configuration thereof provides a larger degree of constructional free-play but nevertheless enables a secure, targeted and defined introduction of force.

One layout of the sonotrodes for the purposes of an optimal introduction of force is possible in that the aforementioned angle (or angles) of the shoulder (or shoulders) of a functional element are emulated in a corresponding manner in the shape of the sonotrodes. However, it is important hereby to pay general attention to the adequacy of the oscillatory behavior of the sonotrode.

In the further variants of a contact region of the first functional elements, the geometries of the projections of the contact regions forming the energy directors are varied and are again illustrated compared with the embodiment of the first functional element 340 (Illustration (a)).

The variant of a first functional element 480 shown in the Illustration (d) of FIG. 15 comprises two projections 484 and 486 having tips that are directed slightly away from one another in the contact region 482 thereof. An adequate volume 488 for accommodating the smelt during the ultrasonic welding process remains between the projections 484 and 486, whilst moreover, the geometry of the projections imposes a preference for the flow of smelt to be towards the volume 488. The tendency for the smelt to visibly flow out laterally from the contact region in unwanted manner is further decreased thereby compared with the variant of Illustration (a) of FIG. 15.

A still stronger effect for controlling the flow of the smelt toward the predetermined volume between the projections is obtained in the configuration of a first functional element 500 in accordance with Illustration (e) of FIG. 15. In the case of this first functional element 500, the projections 504, 506 of the contact region 502 are curved towards each other and partially enclose the volume 508 between the projections.

Another aspect of the configuration of the contact region of a first functional element will be discussed in conjunction with FIGS. 16A and 16B. Compared with the exemplary embodiment (a) which corresponds to the embodiment of FIG. 14 (*a*), the embodiments of the Illustrations (b), (c) and (d) are each equipped in the contact region with a volume for the accommodation of smelt which is preferably dimensioned to be approx. 5 to approx. 50% greater than the smelt volume resulting from the welding process that has to be displaced. It is further preferred that the volume be approx. 5 to 30% greater, for example 20% greater.

In the Illustration (b) of FIG. 16A, there is shown a first functional element 520 which has a contact region 522 arranged in a T-shape in which a centrally arranged projection 524 serving as an energy director and having a substantially triangle-shaped cross section is formed. In the contact region 524, volumes 526, 528 (illustrated by hatching) which can accommodate the portions of the polymer material of the projection 524 that are to be displaced during the ultrasonic welding process are provided on the sides of the projection on both sides In the exemplary embodiment (c) of FIG. 16A, the first functional element 540 has a T-shaped contact region 542 in which a single projection 544 likewise functions as an energy director. Once again, there are provided on both sides of the projection 544 recesses 546, 548 which can accommodate the volumes of smelt that develop during the ultrasonic welding process and which are to be displaced. The volumes 546, 548 are significantly larger than the volumes 526, 528 of the embodiment shown in Illustration (b), whereby however, for the same dimensioning of the contact region, significantly smaller wall thicknesses having a correspondingly lower strength remain when using identical polymer materials in the T-shaped structure.

For the purposes of further comparison, the first functional element 340 of FIG. 15 (*a*) is shown as Illustration (d) in which the volume 348 for accommodating smelt is arranged between two projections 344, 346 running in parallel. Here, the volume 348 is dimensioned to be somewhat smaller than that in the embodiment of Illustration (b), although the mechanical stability of the contact region 342 of the first functional element 340 is higher than that of the first functional element 520. Since here, as is also the case for variant 180 for example, there are no designated stop boundaries, the smelt volume that is produced depends on the height of the smelt. For this reason, accurate control of the smelt height, e.g., by path-controlled processing of the welding process, is wise in this and similarly configured cases.

Finally, in the micrograph of FIG. 16B, there is shown a particularly preferred embodiment of a first functional element 560 together with a graphical illustration thereof. In the micrograph, it is apparent how the smelt of the polymer material of the projections 564, 566 is accommodated by the volume 568 which is dimensioned such as to be greater than the anticipated smelt volume. In addition, besides the projections 564, 566, there are provided groove-like recesses 570 which can accommodate small smelt volumes that are possibly emerging laterally and thus ensure that an optically optimal result of the connection of the first functional element and the insulating bar connected thereto by a material bond will be obtained.

The groove-like recesses 570 are bounded on the outer faces of the contact region 562 by rib-like projections 576 which each form a stop element so that the first functional element 560 can be brought into a defined position and alignment with respect to the surface of the insulating bar (not shown). In addition, an unintentional excessive deformation of the contact region 562 is thereby prevented.

In the case of this first functional element 560, apart from a high mechanical stability of the contact region 562 including its shoulders 572, 574, a comparatively large volume is provided for accommodating the smelt and in addition care is being taken to ensure that little or no fractions of smelt of the polymer material of the projections 564, 566 are able to visibly emerge laterally The considerations for the conception of a contact region of a first functional element are illustrated once more in FIG. 17.

Serving as a reference, the first functional element 180 with its contact region 182 is shown once again as Illustration (c).

In the case of the variants (a) and (b) of the first functional elements 580, 600, respective volumes 586, 588 and 606, 608 of comparable size are provided on both sides of the projections 584, 604 in the respective T-shaped contact regions 582 and 602 incorporating the projections 584 and 604. In the embodiment of the first functional element 600, the weakening of the shoulders 610 is taken into account by a larger height h shoulder of these parts of the contact region 602 so that the shoulders of the contact region 602 of the first functional element 600 can be loaded in a similar way to the shoulders of the contact region 182 of the first functional element 180. In the case of the first functional element 580, care has to be taken to ensure that here only much smaller forces may be applied in the region of the shoulders 590 in order to prevent deformation of or even damage to the contact region 582. In the two embodiments of a first functional element 580, 600 shown in the form of Illustrations (a) and (b) in FIG. 17, the lateral projections which limit the volumes for the accommodation of the smelt also function at the same time as stop elements.

It has already been pointed out in the context of the description of different embodiments of the insulating profiles in accordance with the invention that the contact zone which is formed by the connection of an insulating bar and a first functional element by means of a material bond can be formed of various sizes depending upon the application or purpose of the insulating profiles in accordance with the invention. In any case, it is important hereby that adequate mechanical strength of the connection between the insulating bar and the first functional element be obtained so that the insulating profile in accordance with the invention can be handled and processed securely.

For the purposes of characterizing the strength of the connection and of the mechanical load-bearing capacity entailed thereby, a test which will be described in greater detail in the context of FIG. 18 is suitable.

FIG. 18 shows a testing device 800 which can be used in a conventional universal test equipment for determining the tensile load limits of components.

The exemplary testing device 800 is arranged for simple profiles with perpendicularly protruding flags; in this case, a tensile force is applied to the flag perpendicularly to the profile body during a test. However, it is also possible to configure the testing devices for other profile geometries and, if necessary, to also consider differing effective directions for the introduction of force insofar as this is useful for obtaining information about the joint zone and the quality of the connection of the joining partners.

The testing device 800 comprises an upper test piece seating 802 as well as a lower test piece seating 804. In the upper test piece seating 802, there is formed a split test piece mounting 806 on which an insulating profile 10 in accordance with the invention (e.g., in the form of an insulating profile carefully cut to length serving as a test piece having a length of from 20 mm to 50 mm) with its insulating bar 12 can be placed, whereby its first functional element 22 can pass through a gap between the two parts of the test piece mounting 806. The illustration of the insulating profile 10 in FIG. 18 is somewhat simplified and does not show all the details that are to be seen in FIG. 1.

The lower test piece seating 804 comprises a pair of clamping jaws 808 in which a section of the first functional element 22 can be clamped.

During the tensile testing process, a continuously increasing force is applied to the joining zone 28 of the insulating profile 10 in the direction of the arrows K1 and K2 until separation of the first functional element from the insulating bar 12 is effected. The parameters of the tensile testing process can be adapted in order to obtain results that are appropriate to the materials; usually, this tensile testing process is effected at a speed of 1 mm/min, 5 mm/min or 10 mm/min. The force determined at the point of failure of the test piece is then standardized to the length of the sample body of the insulating profile. Hereby, it must be ensured during the measurement that the joint zone that is to be examined is loaded over its full area and in a meaningful direction, e.g., by normal force. Insulating profiles in accordance with the invention then exhibit rigidities of approx. 2 N/mm or more, preferably approx. 5 N/mm or more, particularly preferred approx. 10 N/mm or more.

In many of the above exemplary embodiments of insulating profiles in accordance with the invention, strip-like, planar so-called flags are employed as first functional elements. While first functional elements of this type are employed in a variety of manners, they can however, be exchanged if necessary for substantially more complex structured first functional elements.

In like manner, the profile body of the insulating bar itself can be of arbitrary complexity. Many previously known profile geometries from the state of the art and in particular profiles already available commercially can serve as a basis in order to be equipped in accordance with the method in accordance with the invention with further functional elements.

The invention claimed is:

1. A method for the production of an insulating profile, wherein the insulating profile comprises an insulating bar manufactured from a first polymer material which comprises a profile body as well as a first functional element that extend in the longitudinal direction of the insulating profile, wherein the first functional element is connected in a contact region to the insulating bar by a material bond, wherein, in a first step, both the profile body and the first functional element are each manufactured and provided separately, wherein, in a second step downstream thereof, the profile body and the first functional element are supplied in the longitudinal direction of the insulating bar that is to be formed to an ultrasonic welding device in which the profile body and the functional element are connected to one another by a material bond by the formation of a welded joining, wherein the ultrasonic welding device comprises a welding zone that is equipped with a sonotrode, wherein the sonotrode has a recess in which the functional element is guided during the formation of the welded joining, and wherein, during the formation of the welded joining, the profile body and the functional element are brought together into a predetermined first cross-sectional geometry as seen perpendicularly to the longitudinal direction and thereafter are guided with the predetermined first cross-sectional geometry or, if applicable, with a predetermined second cross-sectional geometry that differs from the first cross-sectional geometry, as seen perpendicularly to the longitudinal direction, until the plastics material of the welded joining has solidified to such an extent that the profile body and the first functional element are fixed with the predetermined cross-sectional geometry.

2. The method according to claim 1, wherein the profile body and/or the first functional element are provided in the form of a continuous material or in lengths.

3. The method according to claim 1, wherein the first functional element is manufactured with one or more fusible element(s) which extends/extend in the form of a projection away from a surface of the contact region of the first functional element.

4. The method according to claim 1, wherein the ultrasonic welding process is carried out as a near field welding process, wherein the sonotrode has a direct contact with the first functional element.

5. The method according to claim 1, wherein the welding zone has a length of approximately 5 cm to approximately 50 cm and comprises more than one sonotrode if necessary.

6. The method according to claim 1, wherein, in the welding zone, the sonotrode(s) adopts/adopt different angular positions relative to the profile body taken with reference to the longitudinal direction, wherein the angular positions vary continuously and/or in step-like manner and the spacing of the sonotrode(s) with respect to the surface of the insulating bar is thereby decreased in the throughput direction.

7. The method according to claim 1, wherein the welding zone comprises at least one static sonotrode.

8. The method according to claim 1, wherein the first functional element is formed in the contact region with a shoulder which is in contact with the sonotrode or the sonotrodes in the region of the welding zone.

9. The method according to claim 1, wherein the insulating profile is advanced in the longitudinal direction in the welding zone at a speed of approx. 5 m/min or more.

10. The method according to claim 8, wherein the sonotrode is formed with a slot-like or slit-like recess in such a way as to form two end regions of the sonotrode which are arranged in parallel and which are in contact with the contact region of the first functional element during the formation of the welded joining.

11. The method according to claim 1, wherein the functional element is formed with one or more projections that are in the form of energy directors in the contact region that is to be connected to the profile body.

12. The method according to claim 11, wherein, neighboring the projection or the projections, the functional element is provided with one or more stop elements which defines/define the cross-sectional geometry that is to be obtained when the functional element and the profile body are brought together.

13. The method according to claim 1, wherein the materially bonded connection between the first functional element(s) and the profile body is effected along the longitudinal direction of the insulating profile continuously, in sections or in point-like manner.

\* \* \* \* \*